US005757307A

United States Patent [19]
Nakatani et al.

[11] Patent Number: 5,757,307
[45] Date of Patent: May 26, 1998

[54] RADAR SYSTEM FOR DETECTING DISTANCE, MUTUAL SPEED AND AZIMUTH OF A TARGET OBSTACLE

[75] Inventors: Hiroto Nakatani, Nagoya; Hiroshi Mizuno, Kariya; Hiroshi Hazumi, Nagoya; Akihisa Fujita, Aichi-ken; Hiroshi Naganawa, Kagamigahara; Kunihiko Sasaki, Kuwana, all of Japan

[73] Assignee: Nippondenso Co., Ltd., Kariya, Japan

[21] Appl. No.: 721,453

[22] Filed: Sep. 27, 1996

[30] Foreign Application Priority Data

Sep. 28, 1995 [JP] Japan ................................... 7-251031
Jul. 22, 1996 [JP] Japan ................................... 8-192307

[51] Int. Cl.$^6$ ........................................... G01S 13/93
[52] U.S. Cl. .................. 342/70; 342/71; 342/107; 342/113; 342/115; 342/116; 342/133; 342/146; 342/196
[58] Field of Search ................. 342/70, 71, 72, 342/107, 113, 114, 115, 133, 135, 139, 140, 146, 196, 116

[56] References Cited

U.S. PATENT DOCUMENTS

| | | | |
|---|---|---|---|
| 5,517,197 | 5/1996 | Algeo et al. | 342/70 |
| 5,579,010 | 11/1996 | Iihoshi et al. | 342/70 |
| 5,619,208 | 4/1997 | Tamatsu et al. | 342/70 |
| 5,652,589 | 7/1997 | Ono et al. | 342/70 |

FOREIGN PATENT DOCUMENTS

| | | |
|---|---|---|
| 0 611 969 A1 | 8/1994 | European Pat. Off. |
| 0 690 315 A2 | 11/1996 | European Pat. Off. |
| 54-081793 | 6/1979 | Japan . |
| 57-154077 | 9/1982 | Japan . |
| 2 283 631 | 5/1995 | United Kingdom . |

OTHER PUBLICATIONS

Proceedings of the Vehicular Technology Conference, Stockholm, Jun. 8-10, 1994, vol. 1, 8 Jun. 1994, Institute of Electrical and Electronics Engineers, pp. 438–442, XP000496712, Lissel E et al.: "Radar Sensor for Car Applications".

*Primary Examiner*—John B. Sotomayor
*Attorney, Agent, or Firm*—Cushman Darby & Cushman IP Group of Pillsbury Madison & Sutro LLP

[57] ABSTRACT

Receivers 14 and 16 comprise mixers 14b and 16b for mixing reception signals of receiver antennas 14a and 16a with a transmission signal to generate beat signals B1 and B2, respectively. Signal processing section 20 performs the Fourier transformation of beat signals B1 and B2 supplied from receivers 14 and 16 to obtain the phases of beat signals B1 and B2 and then obtain the azimuth based on the difference of these phases.

18 Claims, 21 Drawing Sheets

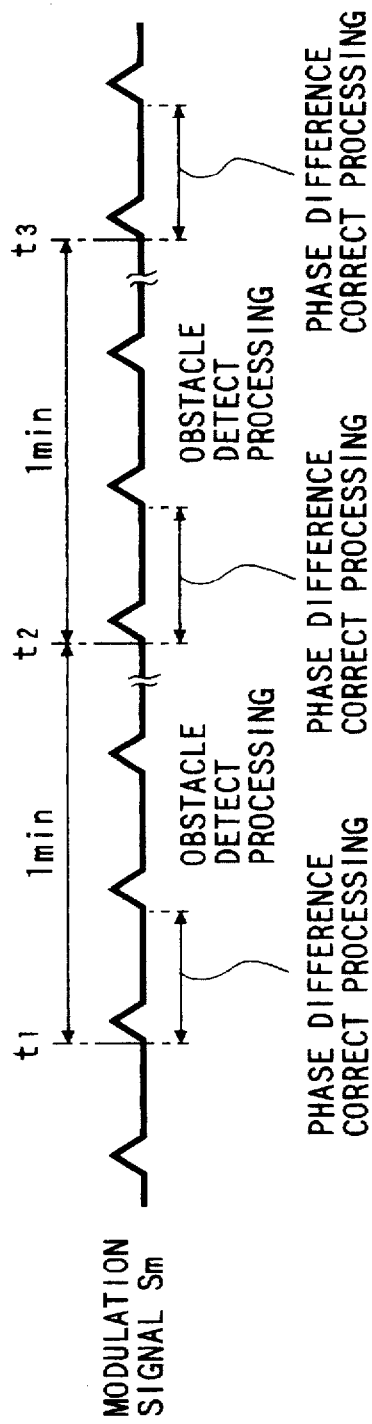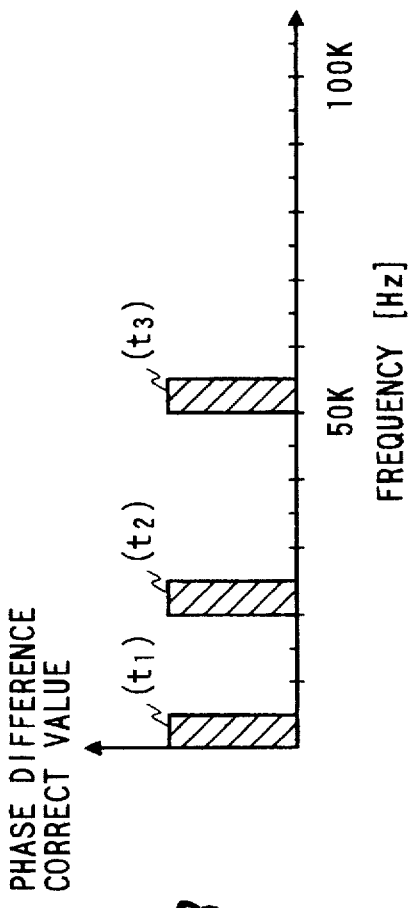

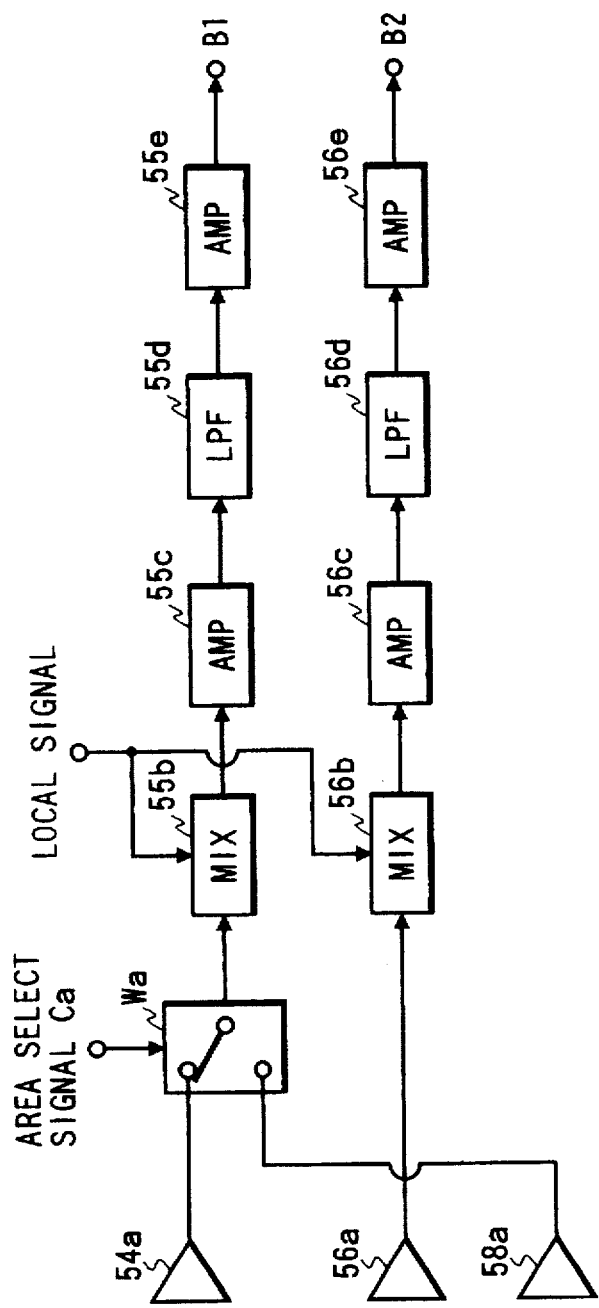

RADAR SYSTEM FOR DETECTING DISTANCE, MUTUAL SPEED AND AZIMUTH OF A TARGET OBSTACLE

BACKGROUND OF THE INVENTION

1. Field of the Invention

This invention relates to a radar system used for preventing collisions between a mobile object, such as an automotive vehicle, and obstacles. The radar system transmits radar waves to a target obstacle and receives reflected radar waves to detect the distance, mutual speed and azimuth of the target obstacle.

2. Related Art

A conventional radar system, is a mono-pulse type radar system which is, for example, disclosed in Unexamined Japanese patent application No. SHO 57-154077, published 1982 (hereinafter the conventional system). According to the conventional system, radar wave is send out from the radar system toward a target obstacle, and the radar wave reflected from the target obstacle is received by a pair of receiver antennas disposed adjacently. The reception signals of respective receiver antennas are mixed with each other by using high-frequency circuit components, such as a magic T, to generate a sum signal and a difference signal thereof. These sum and difference signals are used to detect an amplitude difference and a phase difference between two reception signals. Then, the azimuth of the target obstacle is finally obtained based on the detected amplitude difference and phase difference.

However, according to the conventional system, the reception signals are directly processed as high-frequency signals to generate the sum signal and the difference signal, which requires use of high-frequency circuit components. Since it is difficult to reduce the sizes of high-frequency circuit components, the simplification of the circuit and the downsizing of the conventional system cannot be realized.

SUMMARY OF THE INVENTION

Accordingly, in view of above-described problems encountered in the related art, one of the principal objects of the present invention is to provide a novel and excellent radar system which is capable of accurately detecting the azimuth of a target obstacle while having a simple construction, and a small size.

In order to accomplish this and other related objects, the present invention provides a radar system having various aspects which will be explained hereinafter together with reference numerals in parentheses which show the correspondence to the components of the preferred embodiments described later.

A first aspect of the present invention provides a radar system comprising transmitting means (12, 32) for generating a transmission signal having a predetermined frequency and sending out a radar wave carrying the transmission signal toward a target (M), receiving means (14, 16; 32, 36) having at least two antennas (12a, 16a; 34a, 36a; 54a–58a; 64a–67a; 74a–76a) for receiving the radar wave when the radar wave is reflected from the target, and signal processing means (20, 40, 20a, 20b) for detecting the azimuth (θ) of the target based on an output signal of the receiving means.

According to this first aspect radar system, the transmitting means transmits continuous wave. The receiving means comprises mixing means (14b, 16b; 34b, 36b; 55b, 56b; 68b, 69b; 54b–58b; 75b) for mixing reception signals of the antennas with the transmission signal to produce beat signals (B1, B2; B1a, B1b, B2a, B2b).

The signal processing means comprises analysis means (140), peak detecting means (150), detection value specifying means (160), and azimuth calculating means (180, 190). First of all, analysis means performs the Fourier transformation on each beat signal to obtain a frequency spectrum of each beat signal.

Peak detecting means detects a peak in the frequency spectrum and specifies a frequency corresponding to the detected peak. Detection value specifying means specifies at least one of the phase and the amplitude of the frequency component corresponding to the peak as a detection value resultant from the analysis of the analysis means. And, azimuth calculating means calculates the azimuth of the target based on the difference between detection values for respective beat signals specified by the analysis means, the peak detecting means and the detection value specifying means.

A detailed method of calculating the azimuth of the target based on the phase difference and the amplitude difference of the reception signals is explained hereinafter.

It is assumed that, as shown in FIG. 23, radar wave of wavelength λ, reflected from target M existing in the direction of θ, is simultaneously received by two antennas A1 and A2 disposed at a distance D. The path length difference d of the radar waves received by respective antennas A1 and A2 and the phase difference Δφ caused due to this path length difference d are expressed by the following equations.

$$d = D \cdot \sin\theta \approx D \cdot \theta \quad (1)$$

$$\Delta\phi = 2\pi(d/\lambda) \quad (2)$$

where angle θ is sufficiently small value.

From the relationship of equations (1) and (2), the following equation (3) is derived.

$$\theta = \Delta\phi \cdot \lambda/(2\pi \cdot D) \quad (3)$$

Accordingly, the azimuth θ of target M can be obtained using phase difference Δφ.

Similarly, as the reception levels of antennas A1 and A2, i.e. the amplitudes of the reception signals, are different from each other, it becomes possible to obtain the azimuth based on the difference of the amplitudes.

In this manner, the present invention makes it possible to detect the azimuth of the target without producing a high-frequency sum signal and a high-frequency difference signal produced by mixing the reception signals of different receiving means.

Accordingly, the radar system of the present invention does not require the reception signals to be processed as high-frequency signals, but directly mixes the reception signals with the transmission signal to convert them into intermediate-frequency beat signals. Hence, when compared with the conventional mono-pulse type radar system, the present invention makes it possible to reduce the scale of the high-frequency circuits and simplify the construction of the apparatus, as well as the downsizing and cost reduction of the apparatus.

According to the radar system of the present invention, continuous wave is transmitted and received, and the beat signals are generated by mixing the transmission signal with each reception signal, then the target is detected using these beat signals. In other words, the radar system of the present invention comprises the arrangement of the transmitter-receiver section of a conventional CW (continuous wave) radar.

Therefore, the radar system of the present invention makes it possible to easily obtain the distance and mutual speed of the target using the conventional method adopted in the conventional CW radar system in addition to the detection of the azimuth of the target.

Next, according to a second aspect of the present invention, the transmission signal generated from the transmitting means comprises a plurality of frequency components. The receiving means comprises separating means (34d–34h, 36d–36h) for producing the beat signal for each of the plurality of frequency components of the transmission signal. The analysis means, the peak detecting means, and the detection value specifying means cooperatively specify the detection value for each beat signal and for each of the plurality of frequency components of the transmission signal. And, the azimuth calculating means calculates the azimuth of the target based on the difference of detection values specified for respective beat signals with respect to the same frequency component of the transmission signal.

That is, the radar system of the second aspect invention transmits and receives the continuous wave involving a plurality of frequency components, and generates the beat signals by mixing the transmission signal and the reception signals, then detects the target using these beat signals. Hence, this radar system comprises the arrangement of the transmitter-receiver section of the conventional CW radar system.

Accordingly, the radar system of the second aspect invention makes it possible to easily obtain the distance and mutual speed of the target using the conventional method adopted in the conventional CW radar system in addition to the detection of the azimuth of the target.

Next, according to a third aspect of the present invention, the transmitting means (12, FIG. 1) generates the transmission signal (f, FIG. 2) having an ascending part and a descending part through frequency modulation by a modulation signal (Sm) with a triangular waveform. The receiving means comprises separating means (14c–14e, 16c–16e) for producing the beat signal for each of the ascending part and the descending part of the transmission signal. The analysis means, the peak detecting means, the detection value specifying means cooperatively specify the detection value for each beat signal and for each of the ascending part and descending part of the transmission signal. And, the azimuth calculating means calculates the azimuth of the target based on the difference of detection values specified for respective beat signals with respect to one of the ascending part and descending part of the transmission signal.

That is, the radar system of the third aspect invention transmits and receives the continuous wave which is continuously frequency modulated, and generates the beat signals by mixing the transmission signal and the reception signals, then detects the target using these beat signals. Hence, this radar system also comprises the arrangement of the transmitter-receiver section of a conventional FMCW (frequency-modulated continuous wave) radar system.

Accordingly, the radar system of the third aspect invention makes it possible to easily obtain the distance and mutual speed of the target using the conventional method adopted in the conventional FMCW radar system in addition to the detection of the azimuth of the target.

Furthermore, according to the radar system of the third aspect invention, the continuous wave transmitted from the transmitting means is continuously frequency modulated. Hence, the detection of the azimuth of the target can be surely detected regardless of the mutual speed of the target.

In short, when the continuous wave of constant frequency is transmitted from the transmitting means of the radar system such as CW radar system or multi-frequency CW radar system, the reflected wave, i.e. reception signal, will not be subjected to Doppler shift if the mutual speed of the target is zero. Hence, the transmission signal completely agrees with the reception signal in their frequencies. As a result, the detection of the target will be failed because no beat signal is generated.

However, according to the third aspect invention, the continuous wave transmitted is continuously frequency modulated. Hence, even if the mutual speed of the target is zero, the reception signal is always delayed from the transmission signal. In other words, the frequency difference is always caused between the transmission signal and the reception signal, thus assuring the generation of the beat signals and the detection of the azimuth of the target.

Next, according to a fourth aspect of the present invention, the receiving means comprises at least three antennas (54a, 56a, 58a) aligned in line for receiving the radar wave emitted from the transmitting means and reflected from the target. The mixing means produces the beat signal for each of the reception signal of each antenna. A beat signal selecting means (Wb, FIG. 20) is provided to select a pair of beat signals based on the reception signals of any two neighboring antennas. Then, the selected beat signals are supplied to the signal processing means.

Accordingly, the fourth aspect invention makes it possible to detect the azimuth of the target when the target exists in an area where the reception beams of respective antennas are overlapped. Hence, a wide-range azimuth detection can be realized by adequately disposing respective antennas so that the overlap area of any two reception beams of two neighboring antennas is differentiated from others.

Furthermore, according to the fourth aspect invention, the signal processing means always receive only two beat signals regardless of the number of antennas. Therefore, the arrangement of the signal processing means can be simplified.

For example, the receiving means requires only two circuits for band-limiting and amplifying the beat signals no matter how many antennas are installed. This is advantageous in reducing the size of the receiving means and downsizing the radar system.

Next, according to a fifth aspect of the present invention, the receiving means comprises at least three antennas (54a–58a; 64a–67a) aligned in line for receiving the radar wave emitted from the transmitting means and reflected by the target. The receiving means further comprises reception signal selecting means (wa, FIG. 16; Wa1, Wa2, FIG. 18; Wa1–Wa8, FIG. 19) for selecting a pair of reception signals of any two neighboring antennas from the reception signals of the plural antennas. And, the mixing means (55b, 56b; 68b, 69b) produces the beat signal for each of the reception signals selected by the reception signal selecting means.

According to the fifth aspect of the present invention, it becomes possible to realize a wide-range azimuth detection in the same manner as the radar system of the fourth aspect invention. Furthermore, the arrangement of the signal processing means can be simplified.

Still further, according to the fifth aspect invention, the receiving means requires the circuit arrangement for generating only two beat signals for two reception signals regardless of the number of antennas. Hence, it becomes possible to reduce the number of parts required for the mixing means constituted by high-frequency circuit components, leading to the downsizing of the receiving means (or the radar system itself).

Next, according to a sixth aspect of the present invention, the receiving means comprises signal multiplexing means (90, Wx1, FIGS. 21–22), mixing means (75b), signal separating means (90, Wx2, FIGS. 21–22), and signal reproducing means (74d, 76d). More specifically, a plurality of reception signals entered into the mixing means can be time division multiplexed by the signal multiplexing means. The multiplexed signal is mixed with the transmission signal by the mixing means, and then separated again by the signal separating means operated in synchronism with the signal multiplexing means. Subsequently, the signal having a discontinuous waveform is reconstructed to the beat signal having a continuous waveform; namely, the mixing means is commonly used for the plurality of reception signals to produce the beat signals.

According to the sixth aspect invention, the receiving means can be constructed by the mixers whose number is smaller than the number of the beat signals supplied to the signal processing means. Therefore, the radar system can be simplified and downsized.

In performing the analysis processing, such as Fourier transformation of the beat signal, it is generally necessary to execute the sampling and A/D conversion of beat signals. It is hence necessary to limit the frequency band of the beat signal during the A/D conversion, in order to prevent the to-be-analyzed signal components from being disturbed by the high-frequency signal components (more than half of the sampling frequency) out of the measurement range.

However, such a band-limiting means tends to vary the phase of the beat signal. Furthermore, the change of the phase is not constant in each band-limiting means corresponding to each beat signal. For this reason, there is likelihood that an offset is undesirably caused in the calculation of the phase difference between beat signals.

To solve this problem, according to a seventh aspect of the present invention, the receiving means comprises band limiting means (14d, 16d) for limiting the frequency band of each beat signal supplied to the signal processing means, and signal switching means (W11, W12, FIG. 10; W21, W22, FIG. 13) for selectively supplying the band limiting means a reference signal (Sf) or the beat signal corresponding to the band limiting means. On the other hand, the signal processing means comprises correction value memorizing means (26c) for memorizing the detection value obtained by the signal processing means as a correction value when the signal switching means supplies the reference signal to the band limiting means. And, the azimuth calculating means corrects the detection value specified for each beat signal using the correction value memorized in the correction value memorizing means and calculates the azimuth of the target using the corrected detection value.

As the same reference signal is commonly entered into the plurality of band limiting means, any phase dispersion can be detected based on the outputs of these band limiting means. In the normal operation where each beat signal is entered into the corresponding band limiting means, the azimuth calculating means uses the correction value memorized in the correction value memorizing means to correct the detection value specified for each beat signal. Then, the azimuth of the target can be accurately calculated using the corrected detection value.

Therefore, according to the seventh aspect invention, an accurate detection of the phase difference can be realized by canceling the offset of the phase difference using the correction value when such an offset is caused by the characteristics of each band limiting means, leading to the accurate azimuth detection of the target.

According to an eighth aspect of the present invention, one of beat signals generated from the mixing means can be used for the reference signal used for detecting the correction value. In this case, it becomes possible to realize a simple arrangement for detecting the correction value of the phase difference.

Moreover, according to a ninth aspect of the present invention, signal generating means (29, FIG. 13) is provided for generating a signal having a frequency component substantially identical with the beat signal, and the signal generated from the signal generating means is used as the reference signal. In this case, it becomes possible to produce the reference signal involving arbitrary frequency component. Therefore, an accurate correction value can be obtained anywhere in the entire frequency range which is capable of receiving the beat signals.

BRIEF DESCRIPTION OF THE DRAWINGS

The above and other objects, features and advantages of the present invention will become more apparent from the following detailed description which is to be read in conjunction with the accompanying drawings, in which:

FIGS. 12A and 12B are views illustrating the execution timing of the phase difference correct processing in accordance with the third embodiment of the present invention;

FIG. 16 is a schematic block diagram showing a receiving section of a radar system in accordance with a fifth embodiment of the present invention;

DETAILED DESCRIPTION OF THE PREFERRED EMBODIMENTS

Figure 1:
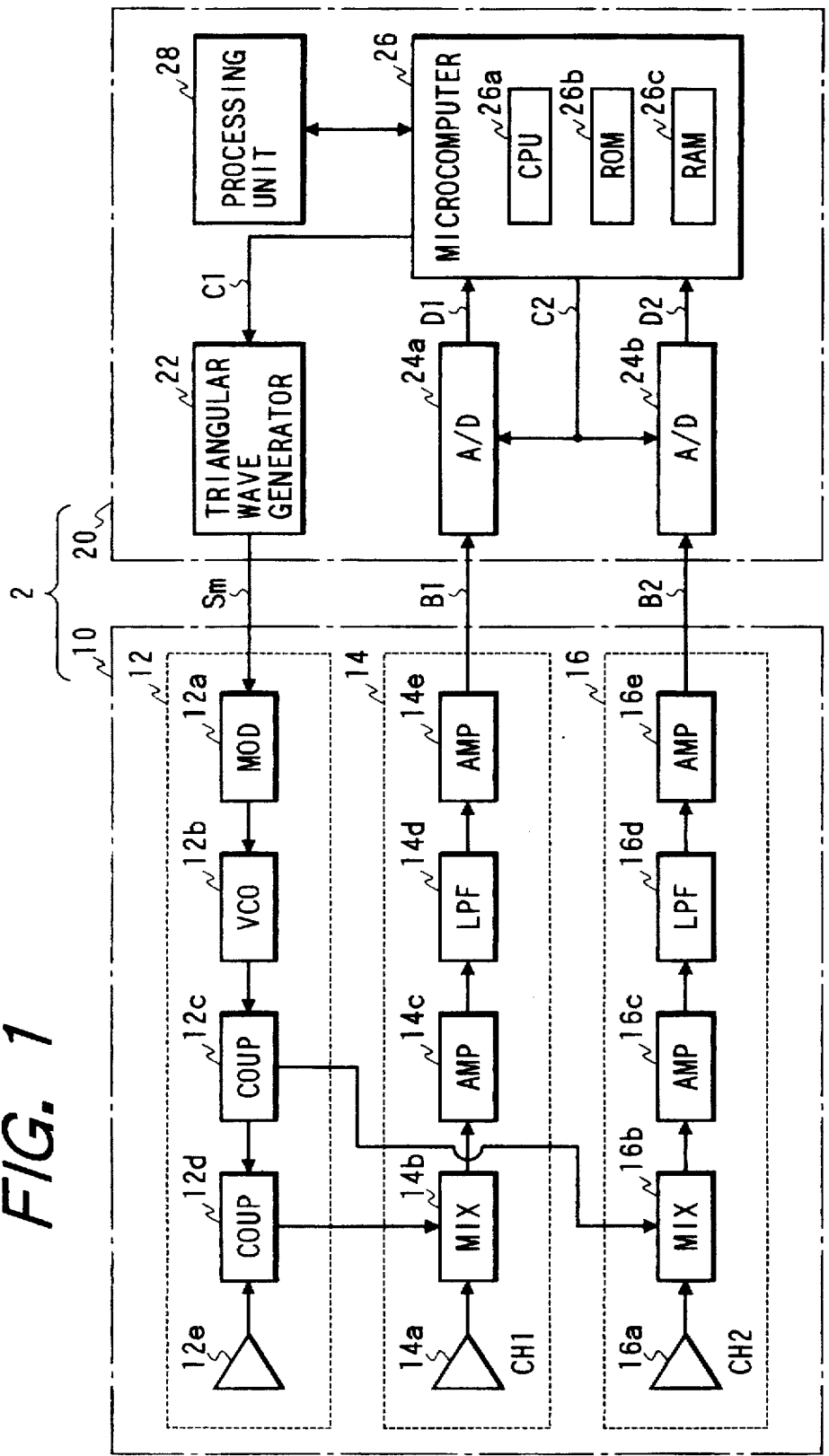
FIG. 1 is a schematic block diagram showing an overall arrangement of a radar system in accordance with a first embodiment of the present invention.

Preferred embodiments of the present invention will be explained in greater detail hereinafter with reference to the accompanying drawings. Identical parts are denoted by the same reference numerals throughout the views.

FIG. 1 is a schematic block diagram showing an overall arrangement of a radar system in accordance with a first embodiment of the present invention. As shown in FIG. 1, a radar system 2 of the first embodiment consists of a transmitter-receiver section 10 and a signal processing section 20. Transmitter-receiver section 10 comprises a transmitter 12 sending out or emitting radar wave having a predetermined frequency modulated in accordance with a modulation signal Sm, and a pair of receivers 14 and 16 receiving radar wave emitted from transmitter 12 and reflected from an obstacle. Signal processing section 20 supplies the modulation signal Sm to transmitter-receiver section 12, and performs the processing for detecting the obstacle based on intermediate-frequency beat signals B1 and B2 generated from receivers 14 and 16.

According to this first embodiment, the radar system is installed in an automotive vehicle to detect an obstacle. Transmitter-receiver section 10 is attached at the front side of a vehicle body, while signal processing section 20 is disposed at a predetermined position in or near a passenger compartment.

Transmitter 12 comprises a voltage-controlled oscillator (VCO) 12b generating a high-frequency signal of milliwave band as a transmission signal, a modulator (MOD) 12a converting modulation signal Sm to a signal having an adjusted level and sending this modulated signal to voltage-controlled oscillator 12b, power distributors (COUP) 12c and 12d generating local signals to be supplied to receivers 14 and 16 by power distributing the transmission signal generated from voltage-controlled oscillator 12b, and a transmitter antenna 12e emitting radar wave in accordance with the transmission signal.

Receiver 14 comprises a receiver antenna 14a receiving radar wave, a mixer 14b mixing the reception signal received by receiving antenna 14a with the local signal supplied from power distributor 12d, a preamplifier 14c amplifying an output of mixer 14b, a low-pass filter 14d removing unnecessary high-frequency components from the output of preamplifier 14c and extracting beat signal B1 representing a frequency difference component between the transmission signal and the reception signal, and a postamplifier 14e amplifying the magnitude of the beat signal B1 to a required level.

Similarly, receiver 16 comprises a receiver antenna 16a receiving radar wave, a mixer 16b mixing the reception signal received by receiving antenna 16a with the local signal supplied from power distributor 12c, a preamplifier 16c amplifying an output of mixer 16b, a low-pass filter 16d removing unnecessary high-frequency components from the output of preamplifier 16c and extracting beat signal B2 representing a frequency difference component between the transmission signal and the reception signal, and a postamplifier 16e amplifying the magnitude of the beat signal B2 to a required level. Receiver 14 is referred to as a receiver channel CH1, while receiver 16 is referred to as a receiver channel CH2.

On the other hand, signal processing section 20 comprises a triangular wave generator 22 generating modulation signal Sm of a triangular waveform in response to an activation signal C1, A/D converters 24a and 24b receiving beat signals B1 and B2 supplied from receivers 14 and 16 and converting them into digital data D1 and D2, as well as a micro computer 26 and a processing unit 28. Micro computer 26, chiefly consisting of CPU 26a, ROM 26b and RAM 26c, sends out activation signals C1 and C2 to operate triangular wave generator 22 and A/D converters 24a, 24b. Furthermore, micro computer 26 performs an obstacle detecting processing (later described) for detecting the distance, mutual speed and azimuth of a detected obstacle based on digital data D1 and D2 obtained through A/d converters 24a and 24b. Processing unit 28 performs the calculation of fast Fourier transformation (FFT) based on the command given from micro computer 26.

A/D converters 24a and 24b operate their operations in response to activation signal C2, and convert the analog beat signals B1 and B2 into digital data D1 and D2 at predetermined time intervals, and write these digital data to a predetermined region of RAM 26c. When a predetermined number of A/D conversions are entirely finished, A/D converters 24a and 24b set a termination flag (not shown) in RAM 26c and stop their operations.

When triangular wave generator 22 is activated in response to activation signal C1, modulation signal Sm is entered through modulator 12a to voltage-controlled oscillator 12b. Voltage-controlled oscillator 12b generates a transmission signal modulated in response to modulation signal Sm. More specifically, the frequency of the transmission signal increases in proportion to the ascending gradient of the triangular waveform of modulation signal Sm (this section is referred to as "ascending part"), while the frequency decreases in proportion to the descending gradient of the triangular waveform of modulation signal Sm (this section is referred to as "descending part").

Figure 2:
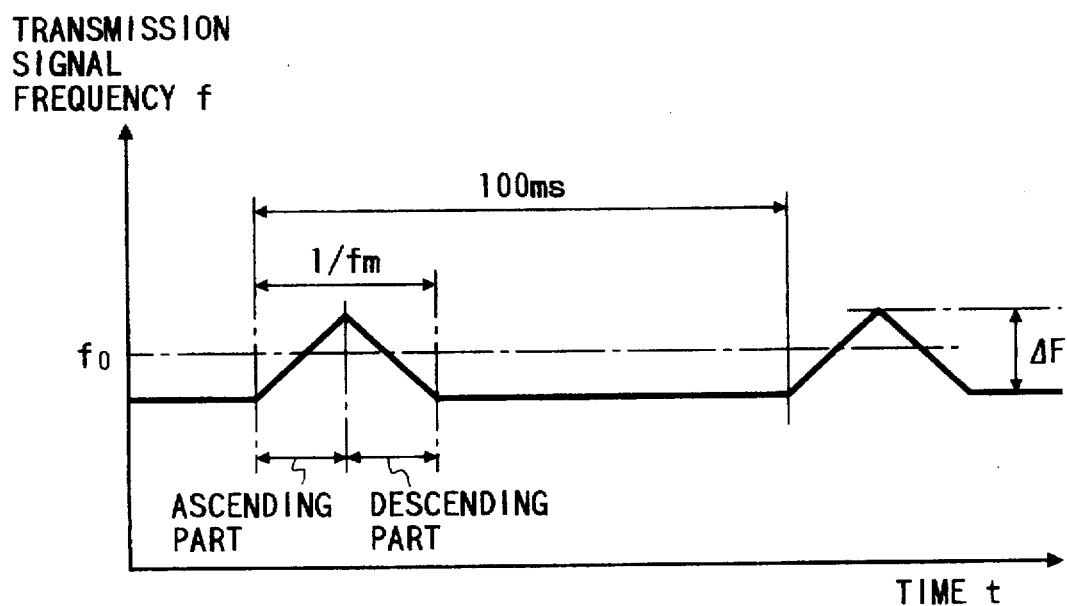
FIG. 2 is a view showing a waveform of an output of a triangular wave generator in accordance with the first embodiment of the present invention.

FIG. 2 is a view showing the modulation of the transmission signal. As shown in FIG. 2, the frequency of the transmission signal is increased or decreased by an amount $\Delta F$ during a time interval of $1/fm$ by modulation signal Sm. The center of this frequency change is $f0$. In FIG. 2, 100 ms represents a period (time interval) of the later-described obstacle detecting processing. Activation signal C1 is generated during the obstacle detecting processing.

Transmitter 12 generates radar wave in accordance with this transmission signal. The radar wave, after it is reflected from an obstacle, comes back to radar system 2 and is received by receivers 14 and 16. Receivers 14 and 16 mix the reception signal obtained from antennas 14a and 16a with the transmission signal obtained from transmitter 12, thereby producing beat signals B1 and B2. In this case, the reception signal is delayed from the transmission signal by a time required for the radar wave going from radar system 2 to an obstacle and returning from the obstacle to radar system 2. Furthermore, if there is any speed difference between radar system 2 and the obstacle, the reception signal will be subjected to Doppler shift. For this reason, beat signals B1 and B2 comprise delay component fr and Doppler component fd.

Figure 4:
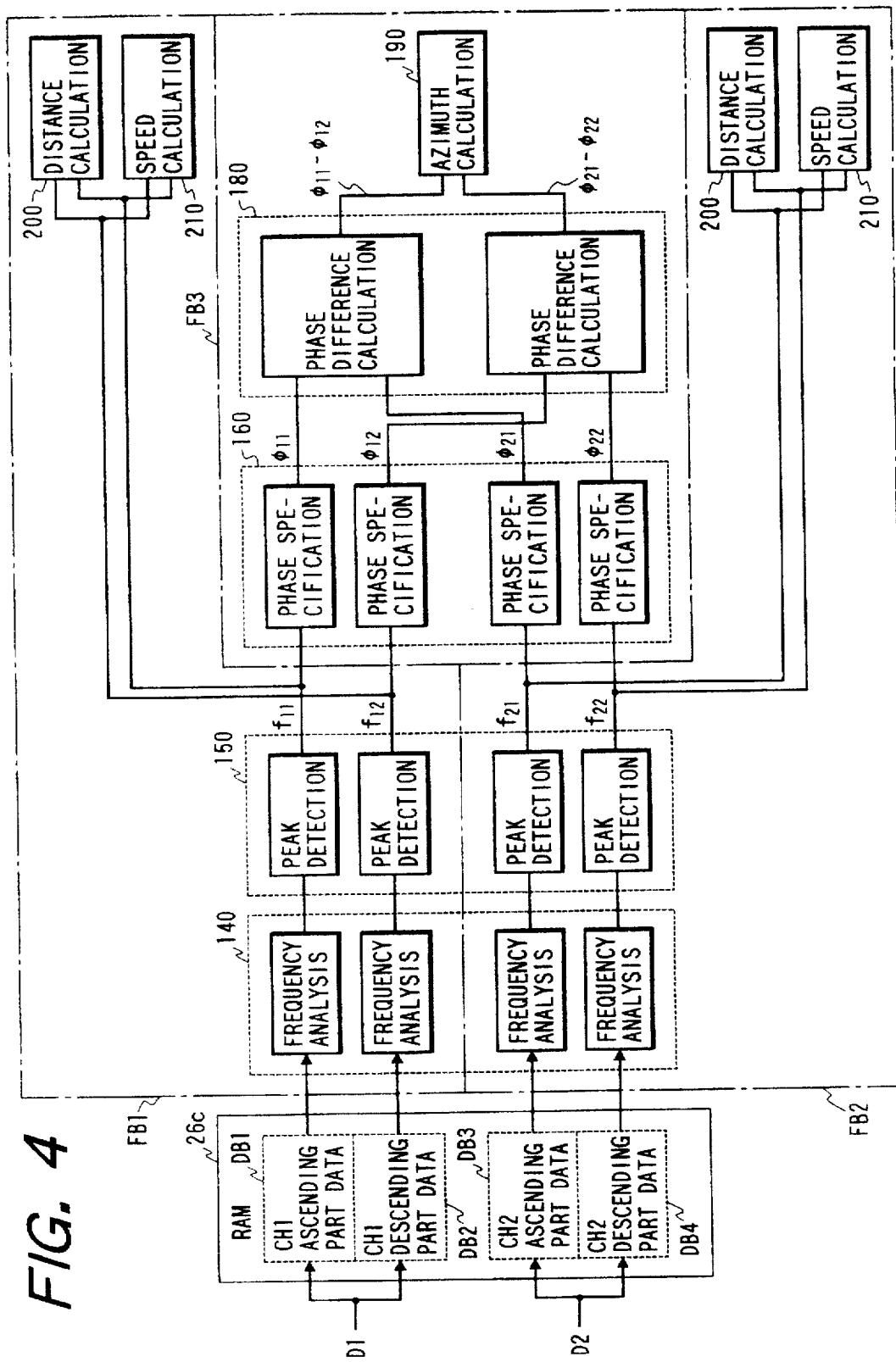
FIG. 4 is a functional block diagram showing the concept of the obstacle detecting processing in accordance with the first embodiment of the present invention.

As shown in FIG. 4, digital data D1, produced from A/D converter 24a by A/D converting beat signal B1, are successively stored in data blocks DB1 and DB2 of RAM 26c. In the same manner, digital data D2, produced from A/D converter 24b by A/D converting beat signal B2, are successively stored in data blocks DB3 and DB4 of RAM 26c.

In this case, A/D converters 24a and 24b start their operations in response to the activation of triangular wave generator 22 and perform a predetermined number of A/D conversions during a period of time corresponding to the generation of modulation signal Sm. Hence, data blocks DB1 and DB3 storing the first half of the data, store the ascending-part data corresponding to the ascending part of the transmission signal. Data blocks DB2 and DB4 storing the second half of the data, store the descending-part data corresponding to the descending part of the transmission signal.

The data stored in each of data blocks DB1 through DB4 is processed by micro computer 26 and processing unit 28 to detect an obstacle.

Next, the obstacle detecting processing executed by CPU 26a of micro computer 26 will be explained with reference to the flow chart of FIG. 3. As described previously, the obstacle detecting processing is performed by the period of 100 ms.

Figure 3:
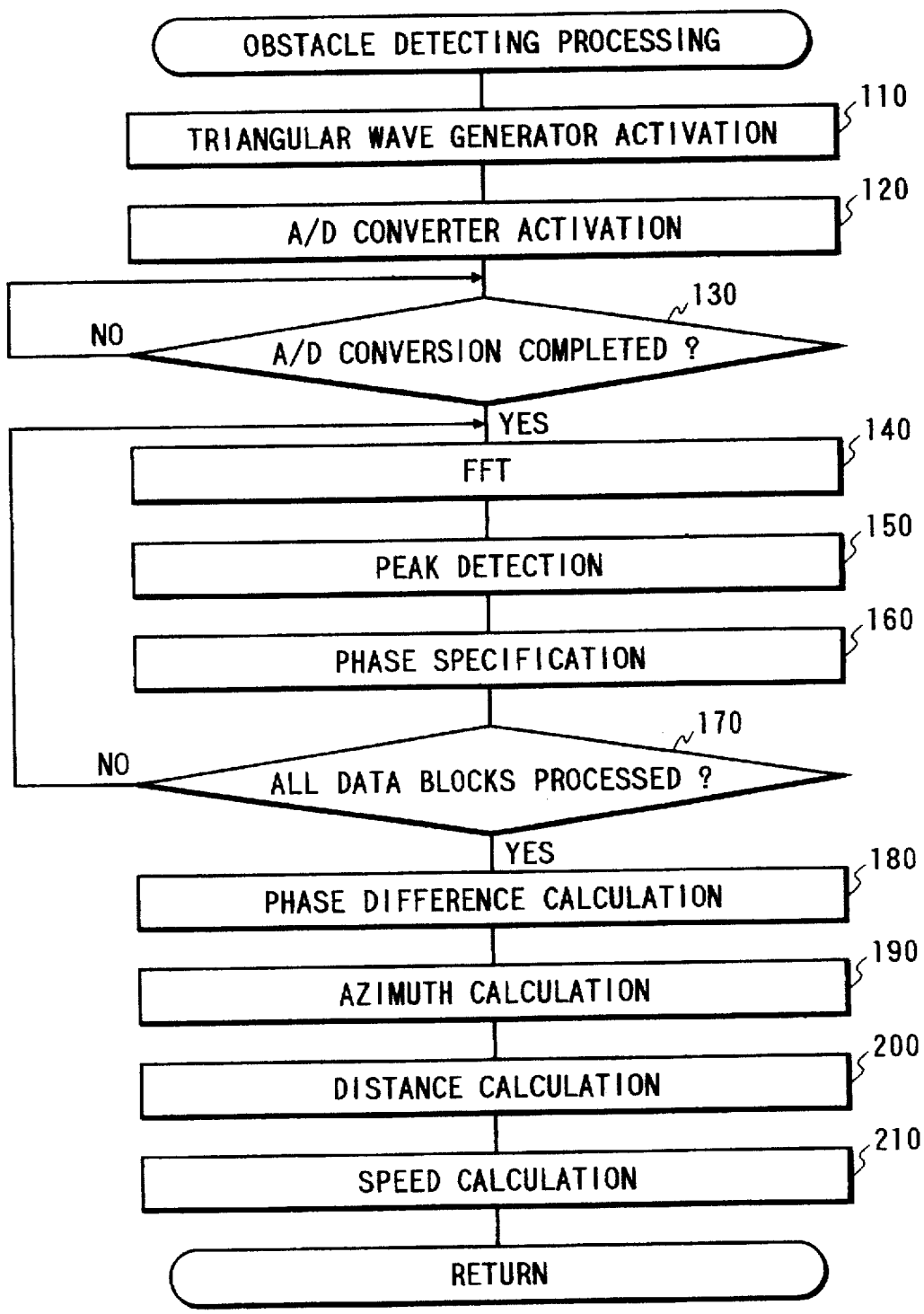
FIG. 3 is a flow chart illustrating the details of an obstacle detecting processing in accordance with the first embodiment of the present invention.

As shown in FIG. 3, after starting this processing, activation signal C1 is generated in step 110 to activate triangular wave generator 22. Then, in step 120, the termination flag is cleared on RAM 26c and activation signal C2 is generated to activate A/D converters 24a and 24b.

With this procedure, modulation signal Sm is generated from triangular wave generator 22. Transmitter 12, when it receives the modulation signal Sm, transmits the radar wave having the modulated frequency. When the radar wave is reflected from an obstacle and received by receivers 14 and 16, beat signals B1 and B2 are generated and converted into digital data D1 and D2 through A/D converters 24a and 24b, and then written to RAM 26c.

In the succeeding step 130, the termination flag on RAM 26c is checked to make a judgement as to whether or not A/D conversion is finished. If the termination flag is not set (i.e. when the A/D conversion is not finished), step 130 is repetitively executed. If the termination flag is set (i.e. when the A/D conversion is finished), the control procedure proceeds to step 140.

In step 140, data blocks DB1 to DB4 on RAM 26c are successively selected and the data of each data block DBi (i=1 to 4) are entered into processing unit 28 to execute the fast Fourier transformation. The data entered in processing unit 28 are subjected to a conventional window processing using a Hanning window or a triangular window or the like to suppress the side lobe appearing in the calculation of the fast Fourier transformation. The frequency spectrum data obtained from this FFT calculation are complex vectors in relation to frequency.

In step 150, a peak of the frequency spectrum is detected based on the absolute value of the complex vector, i.e., an amplitude of the frequency component shown by the complex vector. The frequency corresponding to the detected peak is specified as a beat frequency. Regarding the method of detecting the peak, it will be possible to successively obtain the momentary variation of the amplitude with respect to the frequency and find out a specific frequency before and after which the sign of the momentary variation is inverted. This specific frequency is specified as a peak position.

In step 160, the phase of the frequency component specified in step 150 is calculated. This phase is identical with the angle formed between the complex vector and the real axis; therefore, it can be simply obtained from the complex vector.

In the next step 170, it is checked whether there is any data block DBi not yet processed. If there is any unprocessed data block DBi, the control procedure returns to step 140 and executes the processing of steps 140 to 160 with respect to the unprocessed data block DBi. On the other hand, when all of data blocks are thoroughly processed, the control procedure proceeds to step 180.

Executing the above-described steps 140 through 170 obtains, as a result, a beat frequency f11 at the ascending part and a beat frequency f12 at the descending part of beat signal B1 obtained from the receiver channel CH1 as well as a beast frequency f21 at the ascending part and a beat frequency f22 at the descending part of beat signal B2 obtained from the receiver channel CH2 based on the data stored in data blocks DB1 through DB4. Furthermore, phases $\phi 11$, $\phi 12$, $\phi 21$ and $\phi 22$ are obtained as corresponding to these frequencies f11, f12, f21 and f22, respectively.

Figure 5A:
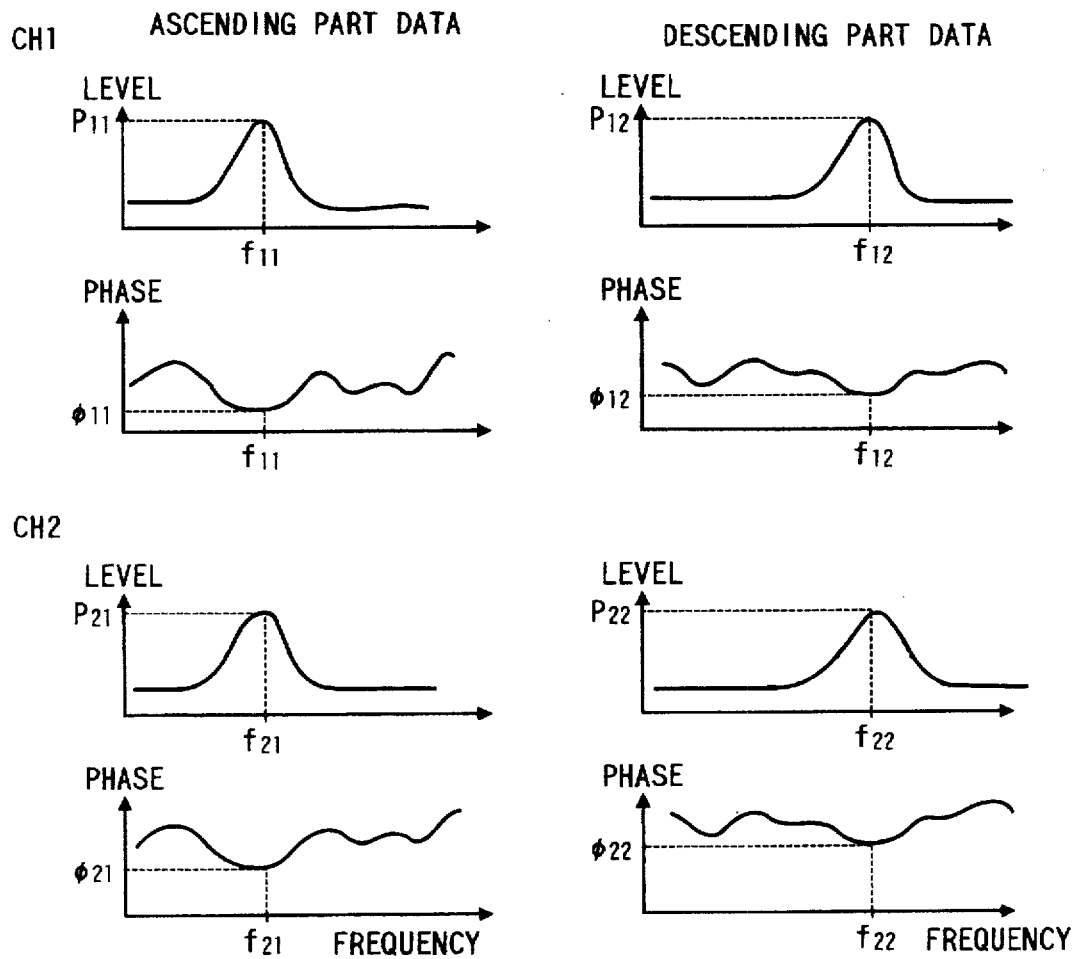
FIGS. 5A and 5B are graphs showing the amplitude and phase of each frequency component involved in a beat signal in accordance with the first embodiment of the present invention.

FIG. 5A shows the amplitude and phase of each frequency component involved in beat signals B1 and B2 based on the complex vector obtained as a result of the calculation in step 140 in each data block DB1 through DB4, i.e. in each of the ascending-part data and descending-part data of receiver channels CH1 and CH2. For simplifying the case, it is assumed that there is only one obstacle. Hence, only one peak position is detected in the frequency spectrum of each data block DBi (i=1 to 4). Peak frequencies of receiver channels CH1 and CH2 are substantially equal to each other in the ascending part and the descending part (i.e. f11≈f21, f21≈f22).

In the next step 180, the phase difference $\Delta\phi j$ (j=1,2) between beat frequency components of receiver channels CH1 and CH2 is obtained in each of the ascending part and the descending part according to the following equation (4).

$$\Delta\phi j = \phi 1j - \phi 2j \qquad (4)$$

Figure 5B:
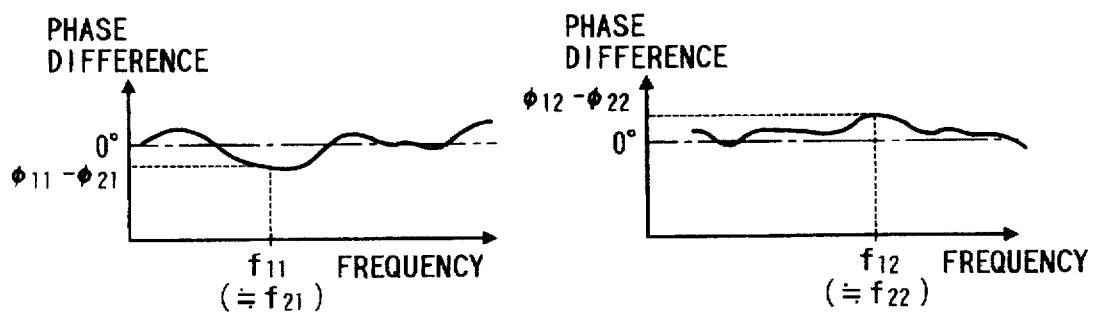

Two absolute values, i.e. phase difference $\Delta\phi 1$ at the ascending part and phase difference $\Delta\phi 2$ at the descending part, are shown in FIG. 5B. As understood from FIG. 5B, these two absolute values are normally identical with each other ($|\Delta\phi 1| \approx |\Delta\phi 2|$). If the difference between these two values exceeds a predetermined value, it is judged that an abnormality has occurred. In such a case, it is possible to stop the processing of this routine and execute an error processing.

In the next step 190, either phase difference Δφ1 or phase difference Δφ2 is selected as a phase difference Δφ for calculating the azimuth. Then, azimuth θ of an obstacle is calculated based on the selected phase difference Δφ.

Figure 6:
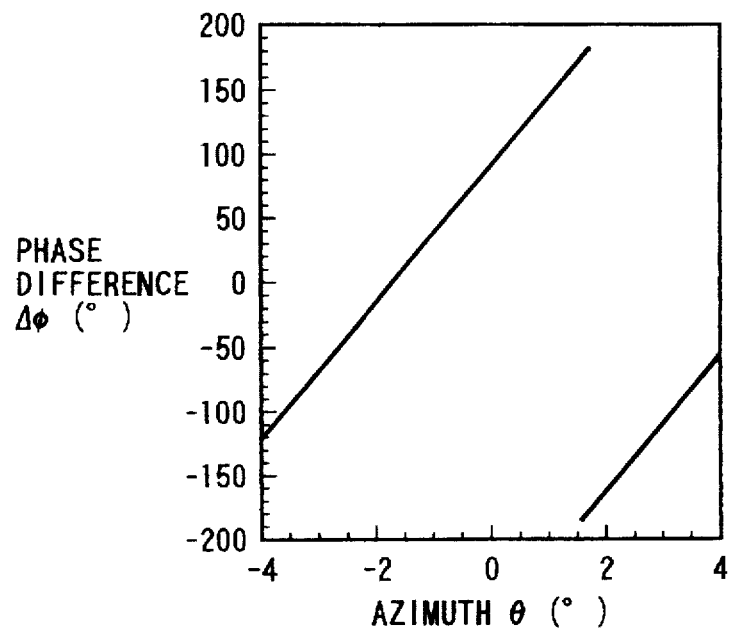
FIG. 6 is a graph showing the relationship between a phase difference $\Delta\phi$ and an azimuth $\theta$ in accordance with the first embodiment of the present invention.

Azimuth θ is theoretically obtained from the equation (3). However, the phase difference Δφ actually obtained from beat signals B1 and B2 is influenced by the path difference in receivers 14 and 16. Accordingly, as shown in FIG. 6, it is usual that azimuth θ is not equal to 0 when phase difference Δφ is 0. To solve this problem, it is desirable to perform actual measurements to obtain adequate correcting data for eliminating the path difference in receivers 14 and 16. The phase difference Δφ is thus corrected by using this correcting data, and then azimuth θ is calculated by using the equation (3).

Alternatively, it is possible to obtain a table showing the relationship between phase difference Δφ and azimuth θ as a result of actual measurements. By using this table, it will be possible to directly obtain azimuth θ corresponding to the obtained phase difference Δφ.

In the next step 200, a distance Ri between radar system 2 and an obstacle is calculated in each receiver channel CHi (i=1,2) using ascending-part and descending-part beat frequencies fi1 and fi2 according to the following equation.

$$Ri = (c/(8 \cdot \Delta F \cdot fm)) \cdot (fi1 + fi2) \quad (5)$$

Furthermore, in step 210, a mutual speed Vi between radar system 2 and the obstacle is calculated according to the following equation.

$$Vi = (c/(4 \cdot f0)) \cdot (fi1 - fi2) \quad (6)$$

Although, in the above-described steps 200 and 210, distances R1 and R2 and mutual speeds R1 and R2 are obtained for respective receiver channels CH1 and CH2, these values are substantially identical with each other (R1≈R2, V1≈V2). Hence, either one of the corresponding two detection values is adequately selected to obtain distance R and mutual speed V as detection values of the obstacle detecting processing.

If the difference between the corresponding two detection values is larger than a predetermined value, it is judged that an abnormality has occurred in the same manner as in step 180. In such a case, it is possible to stop the processing of this routine and execute an error processing.

Thus the calculated distance R, mutual speed V and azimuth θ are used for judging the presence of danger or the like in the judging processing separately executed. If any danger is detected in this kind of judgement, an alarm device will be activated to notify a driver of the danger.

FIG. 4 is a functional block diagram showing the concept of the above-described obstacle detecting processing. In each data block DBi (i=1 to 4) stored in RAM 26c, provided for the ascending-part data and descending-part data of receiver channels CH1 and CH2, there is provided a series of frequency analysis section 140, peak detecting section 150 and phase specifying section 160. Frequency analysis section 140, equivalent to step 140 of the flow chart of FIG. 3, performs the FFT calculation. Peak detecting section 150, equivalent to step 150 of the flow chart of FIG. 3, detects the peak of frequency spectrum to specify the beat frequency. Phase specifying section 160, equivalent to step 160 of the flow chart of FIG. 3, specifies the phase of the frequency component detected by peak detecting section 150.

Furthermore, there are provided a phase difference calculating section 180 and an azimuth calculating section 190. Phase difference calculating section 180, equivalent to step 180 of the flow chart of FIG. 3, obtains phase difference Δφj (=φ1j−φ2j) between beat frequency component phases φ11 and φ21 detected from the ascending-part data (i.e. data blocks DB1 and DB3) and between beat frequency component phases φ12 and φ22 detected from the descending-part data (i.e. data blocks DB2 and DB4). Azimuth calculating section 190, equivalent to step 190 of the flow chart of FIG. 3, calculates azimuth θ based on phase differences Δφj (j=1,2).

Moreover, there are provided distance calculating sections 200 and speed calculating sections 210. Distance calculating section 200, equivalent to step 200 of the flow chart of FIG. 3, obtains distance Ri based on beat frequencies fi1 and fi2 of the ascending part and the descending part in each receiver channel CHi (i=1, 2). Speed calculating section 210, equivalent to step 210 of the flow chart off FIG. 3, obtains mutual speed Vi based on beat frequencies fi1 and fi2 of the ascending part and the descending part in each receiver channel CHi (i=1, 2).

Distance & speed calculating blocks FB1 and FB2, including the frequency analysis section, peak detecting section, distance calculating section, and speed calculating section for each of receiver channels CH1 and CH2, are substantially identical with the receiver circuit for a known FMCW radar system. In other words, radar system 2 of this first embodiment comprises two receiver circuits of FMCW radar system each capable of detecting distance R and mutual speed V of an obstacle. Furthermore, to detect azimuth θ of the obstacle, radar system 2 comprises an azimuth calculating block FB3 comprising the phase specifying section, phase difference calculating section and azimuth calculating section.

As explained in the foregoing description, according to the obstacle detecting radar system 2 of the first embodiment, receivers 14 and 16 combine the reception signals obtained from receiver antennas 14a and 16a with the transmission signal obtained from transmitter 12 to generate beat signals B1 and B2. Signal processing section 20 obtains beat frequency fij and its phase φij for each of the ascending part and the descending part of beat signals B1 and B2 obtained from receiver channels CH1 and CH2 (receiver 14 and 16), and then calculates azimuth θ based on the phase difference Δφj (=φ1j−φ2j) between two receiver channels CH1 and CH2.

Namely, the radar system of the first embodiment is different from the conventional mono-pulse type radar system in that azimuth θ of an obstacle can be detected without using a sum signal and a difference signal obtained by simply mixing high-frequency two reception signals of two receiver antennas.

More specifically, according to the obstacle detecting radar system 2 of the first embodiment, the reception signals of two receiver antennas are immediately mixed with the transmission signal to convert them into beat signal B1 and B2 of intermediate frequency, instead of processing these reception signals of high frequency. Accordingly, it becomes possible to minimize the high-frequency circuit portions of receivers 14 and 16 which were difficult to reduce the size, resulting in desirable downsizing of radar system 2.

Furthermore, radar system 2 of the first embodiment, which sends and receives the continuous wave frequency modified, comprises a pair of FMCW type receiver circuits for obtaining distance R and mutual speed V between radar system 2 and an obstacle based on the beat signals obtained by mixing the transmission signal and the reception signals. The radar system 2 of the first embodiment detects azimuth θ using the principle of the mono-pulse type radar which detects the azimuth from phase difference $\Delta\phi$ derived from the path difference d of radar waves received by two receiver antennas 14a and 16a. Hence, all of distance R, mutual speed V and azimuth $\theta$ can be accurately obtained with respect to a concerned obstacle.

Although the above-described first embodiment detects only one obstacle, it is needless to say that the radar system of the present invention can be arranged to detect a plurality of obstacles simultaneously.

In such a case, the number of peaks appearing on a resultant frequency spectrum is identical with the number of detected obstacles. Hence, in the steps 150 and 160, the peak detection and the phase specification are repetitively performed with respect to each of all the peaks. Furthermore, a pairing processing is added between steps 170 and 180 to combine an ascending-part peak and a descending-part peak of the same obstacle. Then, the processing of steps 180 through 210 is executed for each paired data combined in the above-described pairing processing.

The pairing processing is generally necessary to consider the influence of speed difference between the radar system and an obstacle, because the ascending-part peak and the descending-part peak, even if these two peaks are produced from the same obstacle, are differentiated in their frequencies when there is any speed difference between the radar system and an obstacle. Details of this pairing processing is, for example, disclosed in the Japanese patent application No. HEI 7-9059 by the same applicant as this patent application, and therefore will not be explained hereinafter.

The above-described first embodiment obtains the phases $\phi 11$, $\phi 12$, $\phi 21$ and $\phi 22$ of respective beat frequency components from the FFT calculation result and calculates azimuth $\theta$ based on phase difference $\Delta\phi j$ (=$\phi 1j$–$\phi 2j$) between two receiver channels CH1 and CH2 in each of the ascending part and the descending part. Alternatively, it is also possible to obtain the amplitudes P11, P12, P21 and P22 (refer to FIG. 5A) of respective beat frequency components from the FFT calculation result and calculate azimuth $\theta$ based on amplitude difference $\Delta$Pj (=P1j–P2j) between two receiver channels CH1 and CH2 in each of the ascending part and the descending part.

In this case, the above-described obstacle detecting processing will be necessarily modified so that amplitude Pij of the beat frequency component is specified in step 160, amplitude difference $\Delta$Pj is calculated in step 180, and azimuth $\theta$ is calculated based on the amplitude difference $\Delta$Pj in step 190.

In general, amplitude difference $\Delta$Pj is influenced by the transmission output of transmitter 12, or performance difference of amplifiers 14c, 14e, 16c and 16e constituting receivers 14 and 16. Hence, it is difficult to calculate azimuth $\theta$ from this amplitude difference $\Delta$Pj using a simply numerical expression. It is therefore desirable to obtain a table showing the relationship between amplitude difference $\Delta$Pj and azimuth $\theta$ as a result of actual measurements, so that azimuth $\theta$ can be directly obtained by using this table.

When azimuth $\theta$ is calculated from amplitude Pij, not only there is no necessity of calculating phase $\phi ij$ but also the overall processing amount can be reduced because amplitude Pij is calculated in the peak detecting processing.

Figure 7:
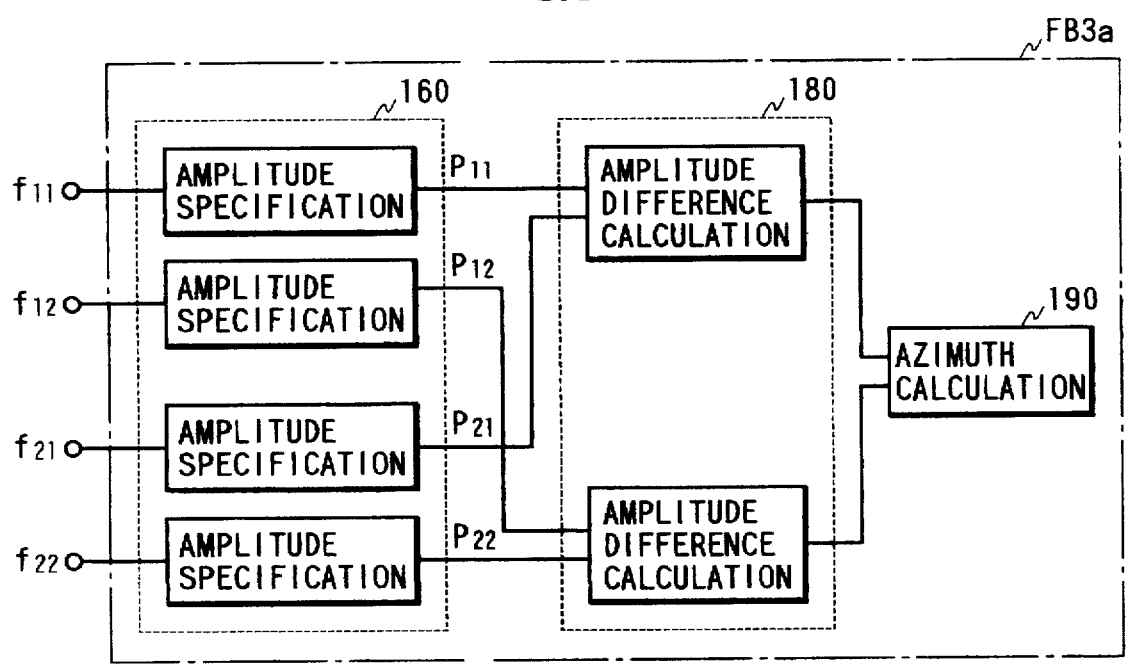
FIG. 7 is a functional block diagram showing an arrangement of an azimuth calculation block in the case where azimuth $\theta$ is calculated based on the amplitude difference of the beat frequency components in accordance with the first embodiment of the present invention.

FIG. 7 shows an arrangement of the functional block when azimuth $\theta$ is calculated from amplitude difference $\Delta$Pj. That is, the azimuth calculating block FB3 of FIG. 4 is replaced by an azimuth calculating block FB3a which comprises both of the amplitude specifying section and the amplitude difference calculating section.

Alternatively, it will be possible to calculate azimuth $\theta$ based on both of phase difference $\Delta\phi j$ and amplitude difference $\Delta$Pj. In such a case, it will be preferable to obtain azimuth $\theta$ from a three-dimensional map with variables of phase difference $\Delta\phi j$ and amplitude difference Pj. Otherwise, it will be possible to average two azimuth values independently calculated; one azimuth calculated from the method using phase difference $\Delta\phi j$ and the other azimuth calculated from the method using amplitude difference $\Delta$Pj. If the difference between these two azimuth values is larger than a predetermined value, it will be preferable to perform an appropriate error processing to enhance the reliability.

The above-described embodiment obtains distances R1 and R2 and mutual speeds V1 and V2 in each of receiver channels CH1 and CH2, and obtains phase differences $\Delta\phi 1$ and $\Delta\phi 2$ in each of the ascending part and the descending part for obtaining azimuth $\theta$. However, it will be possible to calculate either one of corresponding two. For example, the eliminable processing is the FFT calculation, peak detection and phase specification of receiver channel CH2 as well as the distance calculation and the speed calculation based on beat frequencies f21 and f22 of receiver channel CH2, furthermore the phase specification of $\phi 12$ and the calculation of phase difference $\Delta\phi 2$ (=$\phi 12$–$\phi 22$) of the descending-part data. Thus, the total computation amount can be greatly reduced.

Figure 8:
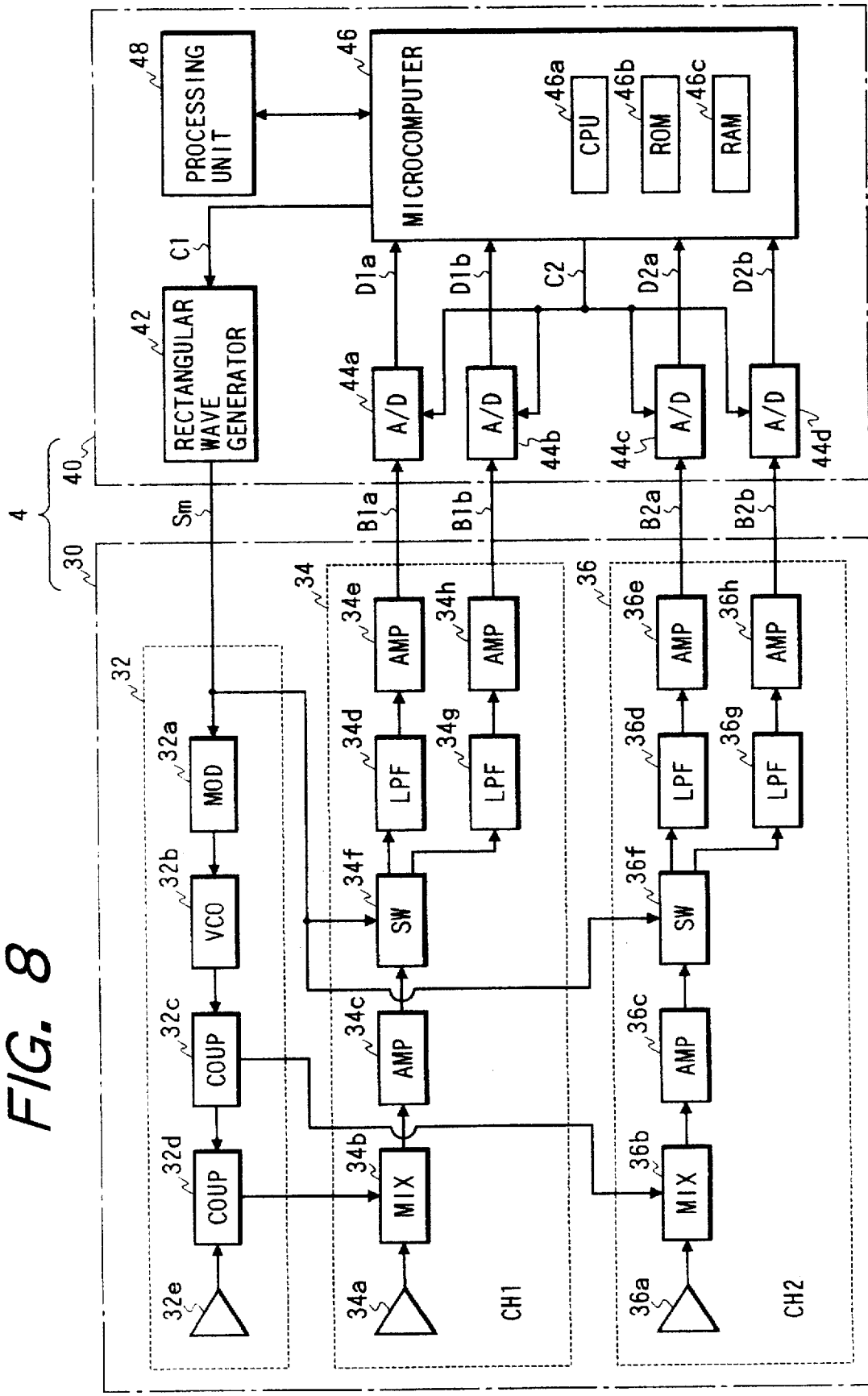
FIG. 8 is a schematic block diagram showing an overall arrangement of a radar system in accordance with a second embodiment of the present invention.

Next, a second embodiment will be explained. FIG. 8 is a schematic block diagram showing an overall arrangement of an obstacle detecting radar system in accordance with a second embodiment of the present invention. As shown in FIG. 8, obstacle detecting radar system 4 of the second embodiment consists of a transmitter-receiver section 30 and a signal processing section 40. Transmitter-receiver section 30 is separated into a transmitter 32 and two receivers 34 and 36. Transmitter 32 has the same arrangement as the first embodiment except for modulation signal Sm entered. Namely, components 32a through 32e of this embodiment correspond to the components 12a through 12e of the first embodiment, respectively.

Modulation signal Sm, used in this second embodiment, is a binary signal having High level and Low level. Transmission signal is modulated into frequency fa when modulation signal Sm is Low level, and is modulated into frequency fb when modulation signal Sm is High level. A difference between frequencies fa and fb is $\Delta f$ (<<fa). The former section where the transmission signal is modulated into frequency fa is referred to as "first frequency part", while the latter section where the transmission signal is modulated into frequency fb is referred to as "second frequency part".

Receiver 34 comprises a receiver antenna 34a, a mixer 34b, a preamplifier 34c, a low-pass filter 34d and a postamplifier 34e, in the same manner as the first embodiment. Components 34a through 34e correspond to the components 14a through 14e of the first embodiment. Receiver 34 further comprises another pair of low-pass filter 34g and postamplifier 34h arranged equivalently to the low-pass filter 34d and postamplifier 34e. In addition, a switch 34f is provided between preamplifier 34c and low-pass filters 34d, 34g. This switch 34f is operative to transmit the output signal of preamplifier 34c to low-pass filter 34d when modulation signal Sm is Low level to cause postamplifier 34e to generate a beat signal B1a of the first frequency part, and to transmit the output signal of preamplifier 34c to low-pass filter 34g when modulation signal Sm is High level to cause postamplifier 34h to generate a beat signal B1b of the second frequency part.

The other receiver 36 has an arrangement completely identical with the above-described receiver 34. Namely, components 36a through 36h correspond to the components 34a through 34h, respectively. Hence, beat signal B2a of the first frequency part is generated from postamplifier 36e, while beat signal B2b of the second frequency part is generated from postamplifier 36h. Receiver 34 is referred to as receiver channel CH1 and receiver 16 is referred to as receiver channel CH2.

On the other hand, signal processing section 40 comprises a rectangular wave generator 42 generating modulation signal Sm of binary levels in response to an activation signal C1, A/D converters 44a through 44d receiving beat signals B1a, B1b, B2a and B2b supplied from receivers 34 and 36 and converting them into digital data D1a, D1b, D2a and D2b, as well as a micro computer 46 and a processing unit 48. Micro computer 46, chiefly consisting of CPU 46a, ROM 46b and RAM 46c, sends out activation signals C1 and C2 to operate rectangular wave generator 42 and A/D converters 44a through 44d. Furthermore, micro computer 46 performs an obstacle detecting processing (later described) for detecting the distance, mutual speed and azimuth of a detected obstacle based on digital data D1a, D1b, D2a and D2b obtained through A/d converters 44a through 44d. Processing unit 48 performs the calculation of fast Fourier transformation (FFT) based on the command given from micro computer 46.

A/D converters 44a through 44d operate their operations in response to activation signal C2. More specifically, two A/D converters 44a and 44c of the four start their operations to perform A/D conversions predetermined times, thereafter remaining two A/D converters 44b and 44d start their operations to perform A/D conversions predetermined times. Digital data D1a through D2b are written to a predetermined region of RAM 46c. When the A/D conversions are entirely finished, A/D converters 44a through 44d set a termination flag (not shown) in RAM 46c and stop their operations.

When rectangular wave generator 42 is activated in response to activation signal C1, modulation signal Sm is entered through modulator 32a to voltage-controlled oscillator 32b. Voltage-controlled oscillator 32b generates a transmission signal of frequency fa when modulation signal Sm is Low level and generates a transmission signal of frequency fb when modulation signal Sm is High level.

Transmitter 32 generates radar wave in accordance with this transmission signal. The radar wave, after it is reflected from an obstacle, comes back to radar system 4 and is received by receivers 34 and 36. Receivers 34 and 36 mix the reception signal obtained from antennas 34a and 36a with the transmission signal obtained from transmitter 32, thereby producing beat signals B1a, B1b, B2a and B2b which are separately generated from the first frequency part and the second frequency part. If there is any speed difference between radar system 4 and the obstacle, the reception signal will be subjected to Doppler shift. For this reason, beat signals B1a, B1b, B2a and B2b comprise Doppler component fd.

Figure 9:
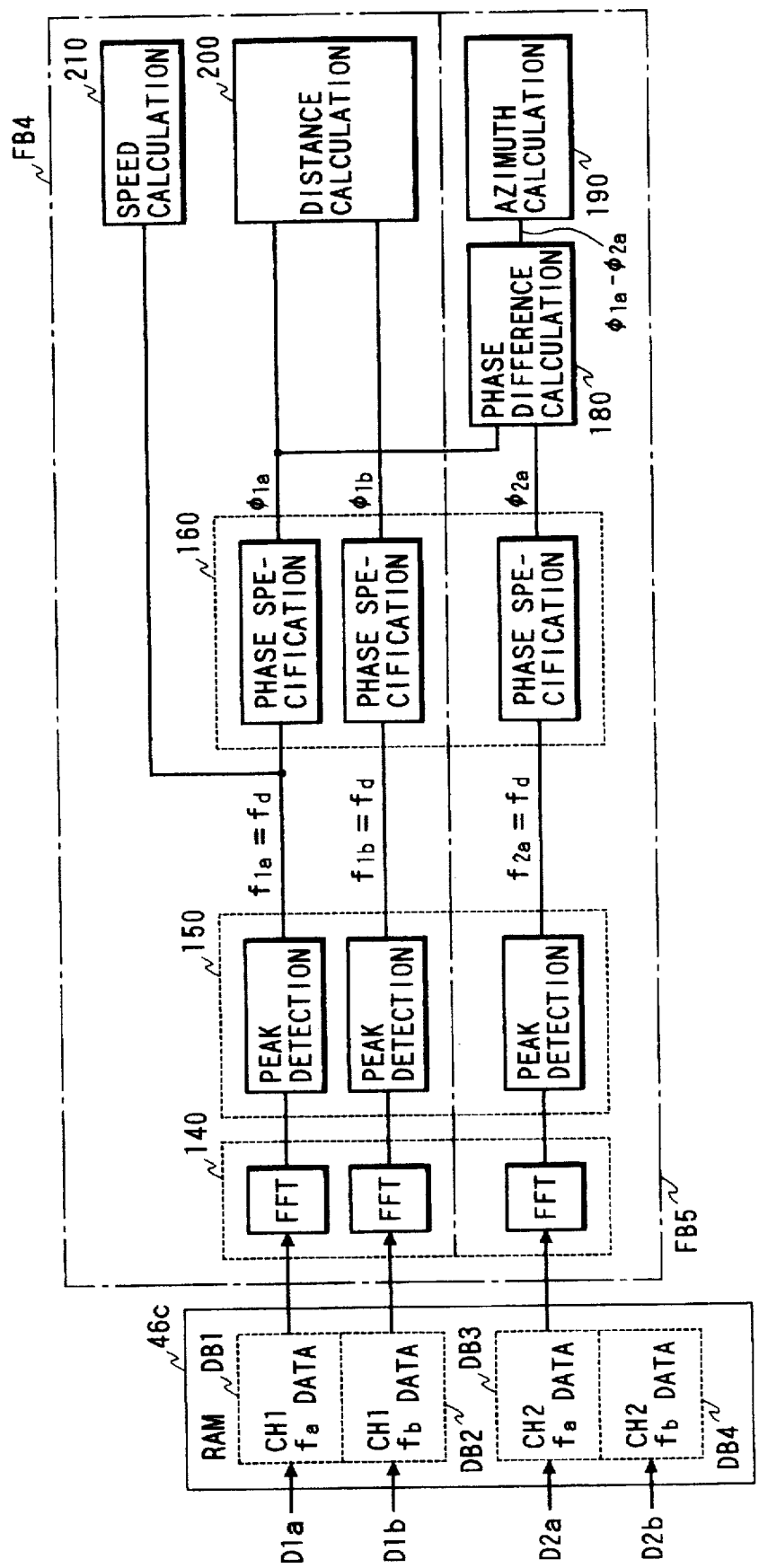
FIG. 9 is a functional block diagram showing the concept of an obstacle detecting processing in accordance with the second embodiment of the present invention.

As shown in FIG. 9, digital data D1a, D1b, D2a and D2b, which are produced from A/D converters 44a through 44d A/D converting the beat signals B1a, B1b, B2a and B2b, are successively stored in data blocks DB1 through DB4 of RAM 46c.

The data stored in data blocks DB1 through DB4 are processed by micro computer 46 and processing unit 48 to detect an obstacle.

The control flow of the obstacle detecting processing executed by CPU 46a of micro computer 46 is substantially identical with the flow chart shown in FIG. 3 although details of the processing in each step may be differentiated. Accordingly, the different processing will be explained hereinafter.

First, rectangular wave generator 42 is activated in step 110. Then, the processing of steps 120 through 170 is executed in the same manner as in the first embodiment. However, in this embodiment, data block DB4 is not processed and the data blocks DB1 through DB3 are processed. As a result, beat frequencies f1a, f1b and f2a and phases $\phi 1a$, $\phi 1b$ and $\phi 2a$ are calculated for the first frequency part and the second frequency part of receiver channel CH1 and the first frequency part of receiver channel CH2. Beat frequencies f1a, f1b and f2a calculated in this embodiment are equal to Doppler frequency fd derived from the mutual speed between the radar system and an obstacle.

In the next step 180, phase difference $\Delta\phi a$ ($=\phi 1a-\phi 2a$) of the beat frequency component between receiver channels CH1 and CH2 is obtained for the first frequency part. In the next step 190, phase difference $\Delta\phi a$ is specified as phase difference $\Delta\phi$ for obtaining azimuth $\theta$ and the azimuth $\theta$ is calculated in the same manner as in the first embodiment.

In the next step 200, distance R is calculated. For only receiver channel CH1, a phase difference $\Delta\phi r$ ($\phi 1a-\phi 1b$) is obtained as a difference between phase $\phi 1a$ of the first frequency part and phase $\phi 1b$ of the second frequency part. The following equation (7) is used to obtain distance R based on this phase difference $\Delta\phi r$.

$$R = c \cdot \Delta\phi r / (4\pi \cdot \Delta f) \quad (7)$$

In the next step 210, the following equation (8) is used to obtain mutual speed V between the radar system and an obstacle based on beat frequency f1a ($=fd$) of the first frequency part of receiver channel CH1.

$$V = (c/(4 \cdot fa)) \cdot f1a \quad (8)$$

Thus calculated distance R, mutual speed V and azimuth $\theta$ are used for judging the presence of danger or the like in the judging processing separately executed in the same manner as in the first embodiment.

FIG. 9 is a functional block diagram showing the concept of the above-described obstacle detecting processing. In each data block DBi (i=1 to 3) stored in RAM 46c, there is provided a series of frequency analysis section 140 (equivalent to step 140 of the flow chart of FIG. 3), peak detecting section 150 (equivalent to step 150) and phase specifying section 160 (equivalent to step 160). Furthermore, there are provided a phase difference calculating section 180 (equivalent to step 180), an azimuth calculating section 190 (equivalent to step 190), a distance calculating section 200 (equivalent to step 200) and a speed calculating section 210 (equivalent to step 210).

Phase difference calculating section 180 calculates phase difference $\Delta\phi a$ ($=\phi 1a-\phi 2a$) between receiver channels CH1 and CH2 in the first frequency part. Azimuth calculating section 190 calculates the azimuth based on the calculation result of phase difference calculating section 180. Distance calculating section 200 calculates distance R based on phase difference $\Delta\phi r$ ($=\phi 1a-\phi 1b$) between the first frequency part and the second frequency part in the receiver channel CH1. Speed calculating section 210 calculates mutual speed V based on the beat frequency f1a of the first frequency part of receiver channel CH1.

A distance & speed calculating block FB4, consisting of the frequency, analysis section, peak detecting section, phase specifying section, distance calculating section, and speed calculating section for the receiver channel CH1, is substantially identical with the receiver circuit for a known 2-frequency (dual-frequency) CW radar system. In other words, in addition to the receiver arrangement (distance & speed calculating block FB4) of the 2-frequency CW radar system capable of detecting the distance and mutual speed of an obstacle, radar system 4 of this second embodiment comprises the azimuth calculating block FB5 consisting of an arrangement for obtaining the beat frequency and phase of the first frequency part involved in the receiver arrangement of the 2-frequency CW radar system, and the phase difference calculating section and the azimuth calculating section provided for detecting the azimuth θ of the obstacle.

As explained in the foregoing description, according to the obstacle detecting radar system 4 of the second embodiment, receivers 34 and 36 combine the reception signals obtained from receiver antennas 34a and 36a with the transmission signal obtained from transmitter 32 for each of the first frequency part and the second frequency part to generate beat signals B1a, B1b, B2a and B2b. Signal processing section 40 obtains beat frequency and its phase based on each beat signal, and then calculates azimuth θ based on the phase difference $\Delta\phi a$ ($=\phi1a-\phi2a$) between two receiver channels CH1 and CH2 in the first frequency part.

Namely, in the same manner as the first embodiment, the radar system of the second embodiment is different from the conventional mono-pulse type radar system in that azimuth θ of an obstacle can be detected without using the sum signal and the difference signal.

Accordingly, in the same manner as in the first embodiment, it becomes possible to minimize the high-frequency circuit portions of receivers 34 and 36 which were difficult to reduce the size, resulting in desirable downsizing of radar system 4.

According to the radar system 5 of the second embodiment, only two frequencies fa and fb slightly different from each other are used as the transmission signal. Hence, the frequency band occupied by this radar system 4 is fairly small. Accordingly, it becomes possible to obtain a radar system robust against external noises.

The second embodiment does not use the data of the second frequency part of receiver channel CH2. Hence, it will be possible to omit A/D converter 44d, low-pass filter 36g, postamplifier 36h and switch 36f.

Although the second embodiment calculates the azimuth based on the phase difference $\Delta\phi a$, it will be possible to calculate azimuth θ based on the amplitude difference of the beat frequency components between receiver channels CH1 and CH2, or to calculate azimuth θ based on both of the phase difference and the amplitude difference in the same manner as in the first embodiment.

Furthermore, the second embodiment does not execute the processing of the second frequency part of receiver channel CH2, and uses the receiver channel CH1 for calculating the distance R and mutual speed V. Furthermore, calculation of azimuth θ is performed in the first frequency part only. However, it will be possible to obtain a beat frequency f2b and its phase $\phi 2b$ for the second frequency part of receiver channel CH2 and to calculate the distance R and mutual speed V in each of receiver channels CH1 and CH2 and further possible to calculate the azimuth θ in both of the first frequency part and the second frequency part.

In this case, each of distance R, mutual speed V and azimuth θ will take two values. Hence, it will be possible to add a processing for comparing these two values to enhance the reliability of the calculation data.

Next, a third embodiment of the present invention will be explained.

Figure 10:
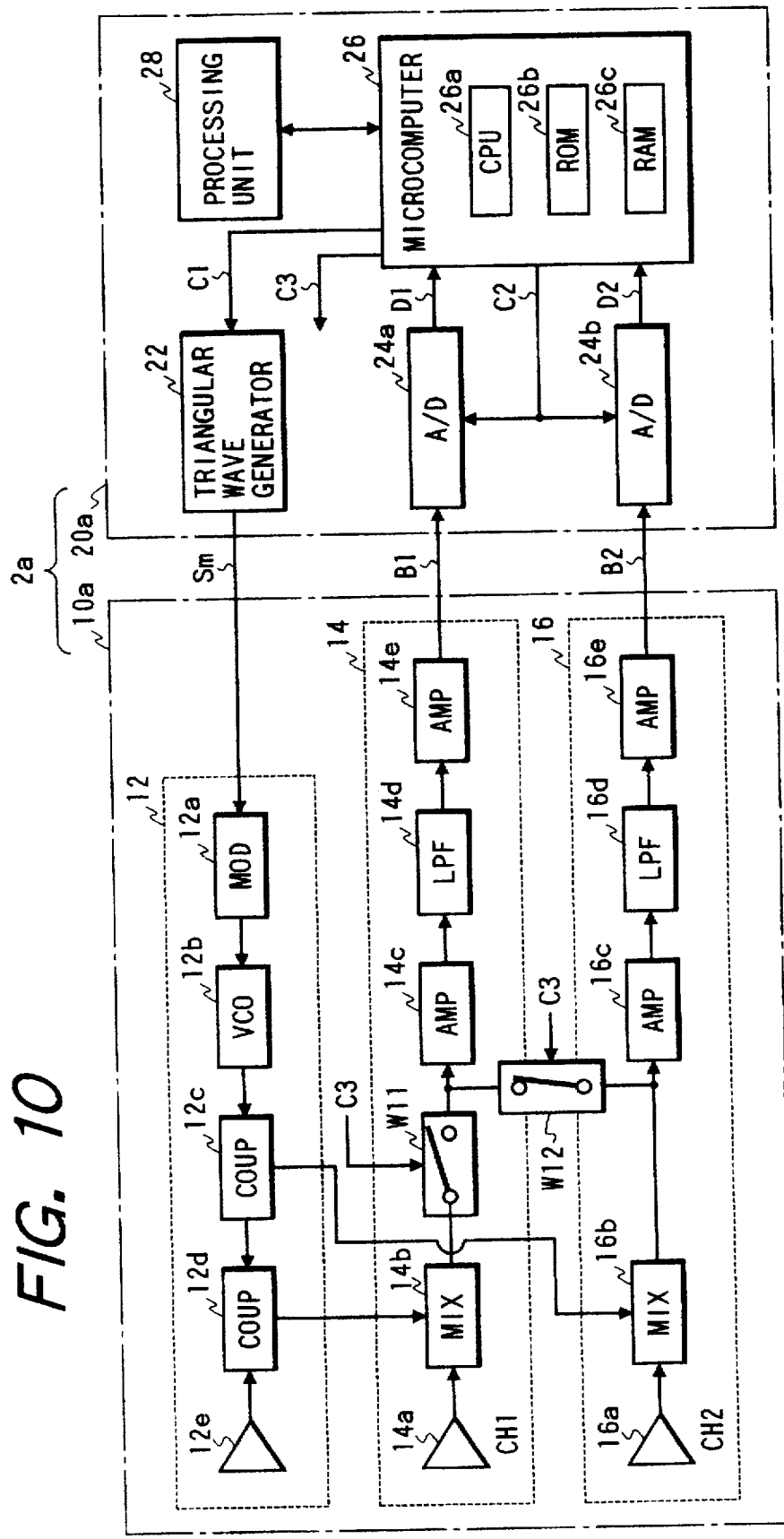
FIG. 10 is a schematic block diagram showing an overall arrangement of a radar system in accordance with a third embodiment of the present invention.

FIG. 10 is a schematic block diagram showing an overall arrangement of an obstacle detecting radar system in accordance with a third embodiment of the present invention. The radar system 2a of the third embodiment is different from the radar system 2 of the first embodiment in that an arrangement for correcting an offset of the phase difference between the beat signals supplied from receiver channels CH1 and CH2 when such an offset is caused due to phase dispersion in the IF (intermediate frequency) processing section of receivers 14 and 16 comprising preamplifiers 14c, 16c, low-pass filters 14d, 16d and postamplifiers 14e, 16e.

More specifically, as shown in FIG. 10, the radar system 2a of the third embodiment is different from the radar system 2 of the first embodiment in that transmitter-receiver section 10a comprises a switch W11 opened or closed to selectively supply the output of mixer 14b of receiver channel CH1 to preamplifier 14c, a switch W12 opened or closed to selectively supply the output of mixer 16b of receiver channel CH2 to preamplifier 14c of receiver channel CH1, and micro computer 26 generates a changeover signal C3 in response to which the setting of switches W11 and W12 is selected between a first condition where switch W11 is closed and switch W12 is opened and a second condition where switch W11 is opened and switch W12 is closed.

When switches W11 and W12 are set in the first condition, the outputs of mixers 14b and 16b are supplied to preamplifiers 14c and 16c of respective receivers. On the other hand, when switches W11 and W12 are set in the second condition, the outputs of mixer 16b of receiver channel CH2 is supplied to both of preamplifiers 14c and 16c of receiver channels CH1 and CH2.

Hereinafter, a phase difference correct processing, executed in CPU 26a of micro computer 26, will be explained with reference to the flow chart of FIG. 11. It is assumed that switches W11 and W12 are set in the first condition through the initialization processing performed immediately after the turning-on operation of electric power.

Figure 11:
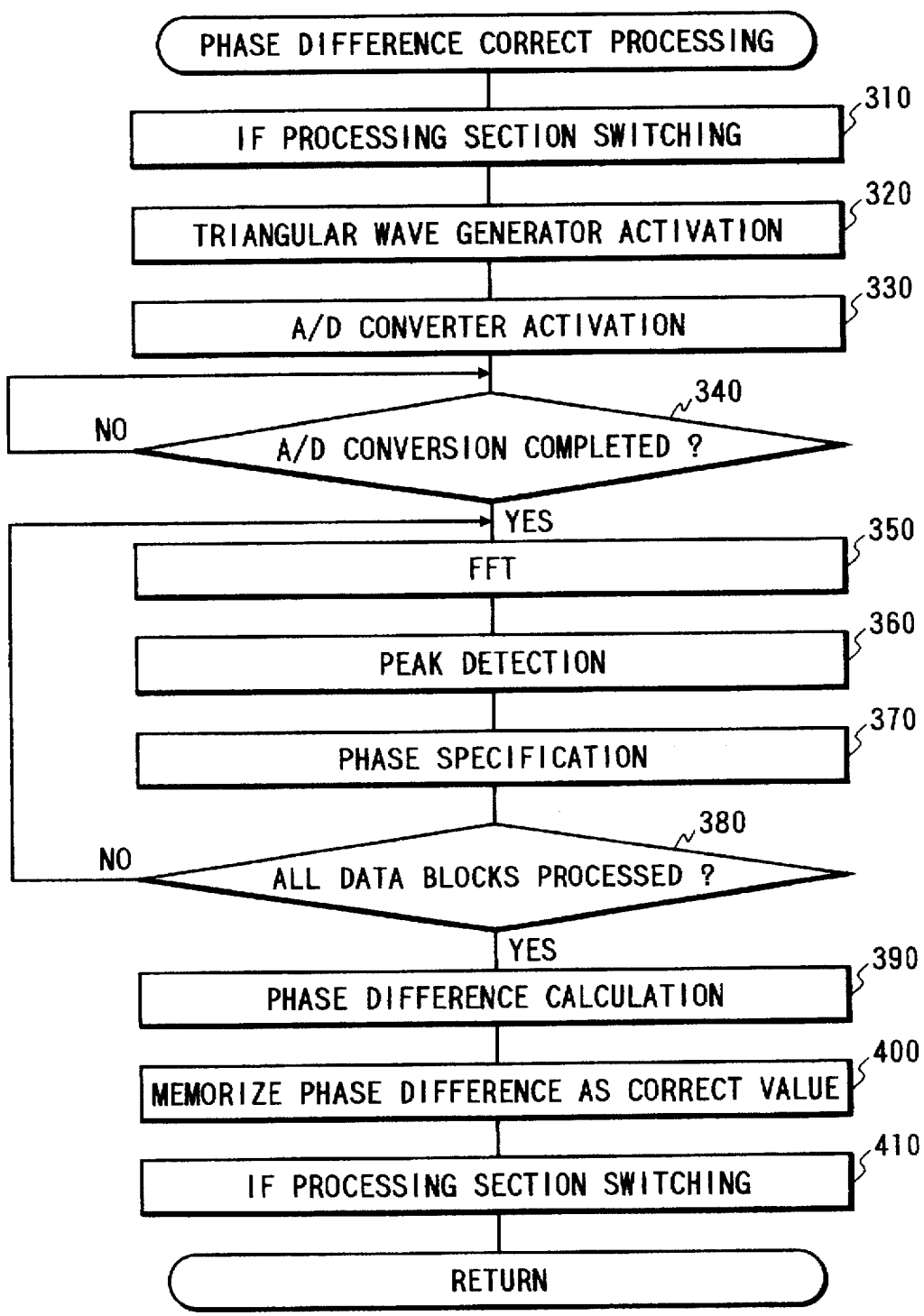
FIG. 11 is a flow chart showing a phase difference correct processing in accordance with the third embodiment of the present invention.

As shown in FIG. 11, after this routine is started, in step 310, changeover signal C3 is generated and the setting condition of switches W11 and W12 is changed to the second condition.

Succeeding steps 320 through 290 of this routine are identical with steps 110 through 180 of the obstacle detecting processing of the first embodiment. Namely, radar wave is sent out from the radar system. When the radar wave is reflected from an obstacle and received by receivers 14 and 16, beat signals B1 and B2 are generated. These beat signals are A/D converted, and are subjected to the FFT calculation. Based on this FFT calculation result, the peak frequencies of beat signals B1 and B2 are detected. And, the phase of each frequency component is specified. The phase difference between beat signals B1 and B2 obtained from respective receiver channels CH1 and CH2 is calculated based on this specified phase.

In the next step 400, the phase difference calculated in the step 390 is memorized in a predetermined area of RAM 26c as a correction value. Then, in step 410, changeover signal C2 is generated to return the setting condition of switches W11 and W12 to the first condition. Then, the processing of this routine is completed.

The same signal is entered into the IF processing circuits of receiver channels CH1 and CH2 during the execution of this phase difference correct processing. Therefore, the phase difference (correction value) obtained through this processing reflects the dispersion of phase characteristics in respective IF processing circuits (chiefly, low-pass filters 14d and 16d) varying the phases of beat signals B1 and B2.

FIG. 12A is a view illustrating the execution timing of the phase difference correct processing. As shown in the drawing, according to this processing, modulation signal Sm is generated in the same manner as the obstacle detecting processing and a reflected radar is received. Hence, it is necessary to interrupt the obstacle detecting processing performed periodically to execute this phase difference correct processing. According to this embodiment, the phase difference correct processing is performed every 1 minute.

One phase difference correct processing obtains the phase difference correct value at a specific frequency in accordance with the condition of a target happening to exist during the processing. Meanwhile, the phase characteristics of the IF processing circuit varies in accordance with the frequency. Accordingly, using the measurement result of such a specific frequency to correct all others will fail to detect accurate measurement values.

In view of this, when the detection of the beat signal is performed in the frequency range of 0 to 100 KHz, this embodiment splits this frequency range into 20 divisions and memorizes the correction value in each frequency division, as shown in FIG. 12B.

When the correction value is memorized in each frequency division, it will be desirable to continuously execute the phase difference correct processing until the correction values of all the frequency divisions are stored and thereafter the ordinary obstacle detecting processing is started. It is desirable that the phase difference correct processing is periodically executed to renew and the correct values when they are adequately stored. FIG. 12B shows the phase difference correct values of respective frequency divisions stored at predetermined time intervals.

Then, the correction value thus obtained is used to correct the phase difference $\Delta\phi j$ of the beat frequency component calculated in step 180 of the obstacle detecting processing. More detail, when the phase difference $\Delta\phi j$ of the frequency component having a certain beat frequency is calculated, a correction value $\Delta\phi 0$ corresponding to this beat frequency is selected from the correction values stored through the above-described phase difference correct processing. Then, the calculated phase difference $\Delta\phi j$ is subtracted by the selected correction value $\Delta\phi 0$ (i.e. $\Delta\phi j-\Delta\phi 0$), thereby completing the correcting procedure. Then, using the corrected phase difference $\Delta\phi j-\Delta\phi 0$, the processing of calculating azimuth $\theta$ of the obstacle is performed in the next step 190 of the obstacle detecting processing.

As explained above, according to the radar system of this embodiment, the same signal is entered into both IF processing circuits of respective receiver channels CH1 and CH2. The phase difference obtainable from the same signal entered into the IF circuits is obtained as a correction value. Then, using this correction value, the phase difference calculated in the ordinary obstacle detecting processing is corrected.

Accordingly, according to the radar system of this embodiment, it becomes possible to cancel any offset of the phase difference between the beat signals by the correction value when such an offset is produced due to the presence of phase characteristics dispersion in each IF processing circuit. Therefore, it becomes possible to obtain an accurate phase difference, and as a result the azimuth detection can be accurately performed.

Furthermore, splitting the frequency range of the beat signal to be detected into a plurality of divisions for obtaining the correction value in each frequency division is effective to realize a stable azimuth detection.

Next, a fourth embodiment of the present invention will be explained.

Figure 13:
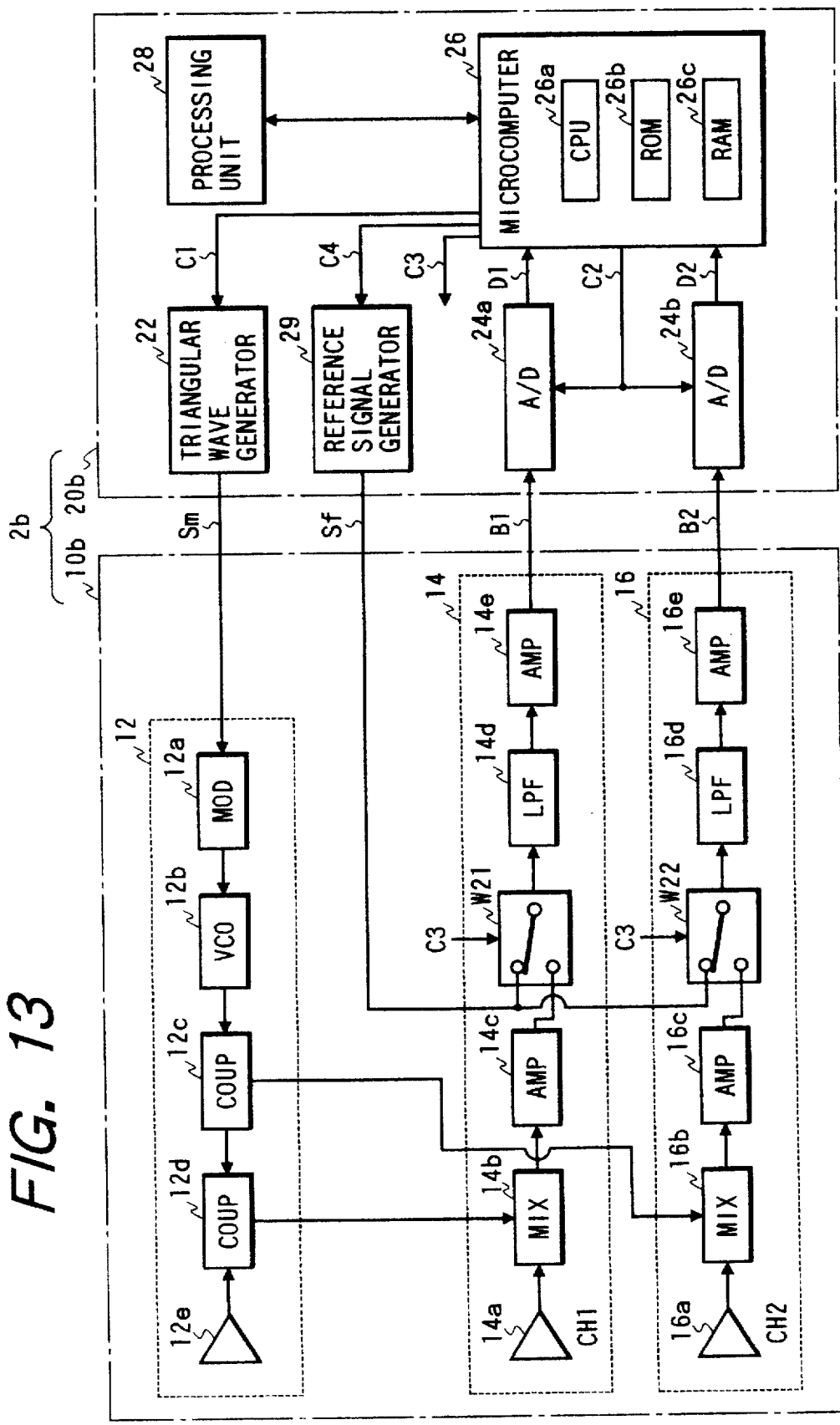
FIG. 13 is a schematic block diagram showing an overall arrangement of a radar system in accordance with a fourth embodiment of the present invention.

FIG. 13 is a schematic block diagram showing an overall arrangement of an obstacle detecting radar system in accordance with a fourth embodiment of the present invention. The fourth embodiment is similar to the third embodiment in that the error of the phase difference caused between the beat signals due to the presence of phase characteristics dispersion in each IF processing circuit can be corrected.

As shown in FIG. 13, a radar system 2b of the fourth embodiment is different from the radar system 1 of the first embodiment in the following arrangement. Receiver 14 comprises a switch W21 selectively supplying the output of preamplifier 14c or a reference signal Sf to low-pass filter 14d similarly, receiver 16 comprises a switch W22 selectively supplying the output of preamplifier 16c or reference signal Sf to low-pass filter 16d. Signal processing section 20 comprises a reference signal generator 29 generating reference signal Sf. Micro computer 26 generates changeover signal C3 in response to which the setting of switches W21 and W22 is selected between a first condition where the outputs of preamplifiers 14c and 16c are supplied to low-pass filters 14d and 16d respectively and a second condition where reference signal Sf is supplied to both of low-pass filters 14d and 16d. Furthermore, micro computer 26 generates an activation signal C4 for activating reference signal generator 29.

When the detection of the beat signal is performed in the frequency range of 0 through 100 kHz in the same manner as in the third embodiment, reference signal generator 29 splits this frequency range into 20 divisions and produces reference signal Sf comprising representative frequency components of all the frequency divisions.

Hereinafter, a phase difference correct processing, executed in CPU 26a of micro computer 26, will be explained with reference to the flow chart of FIG. 14. It is assumed that switches W21 and W22 are set in the first condition through the initialization processing performed immediately after the turning-on operation of electric power.

Figure 14:
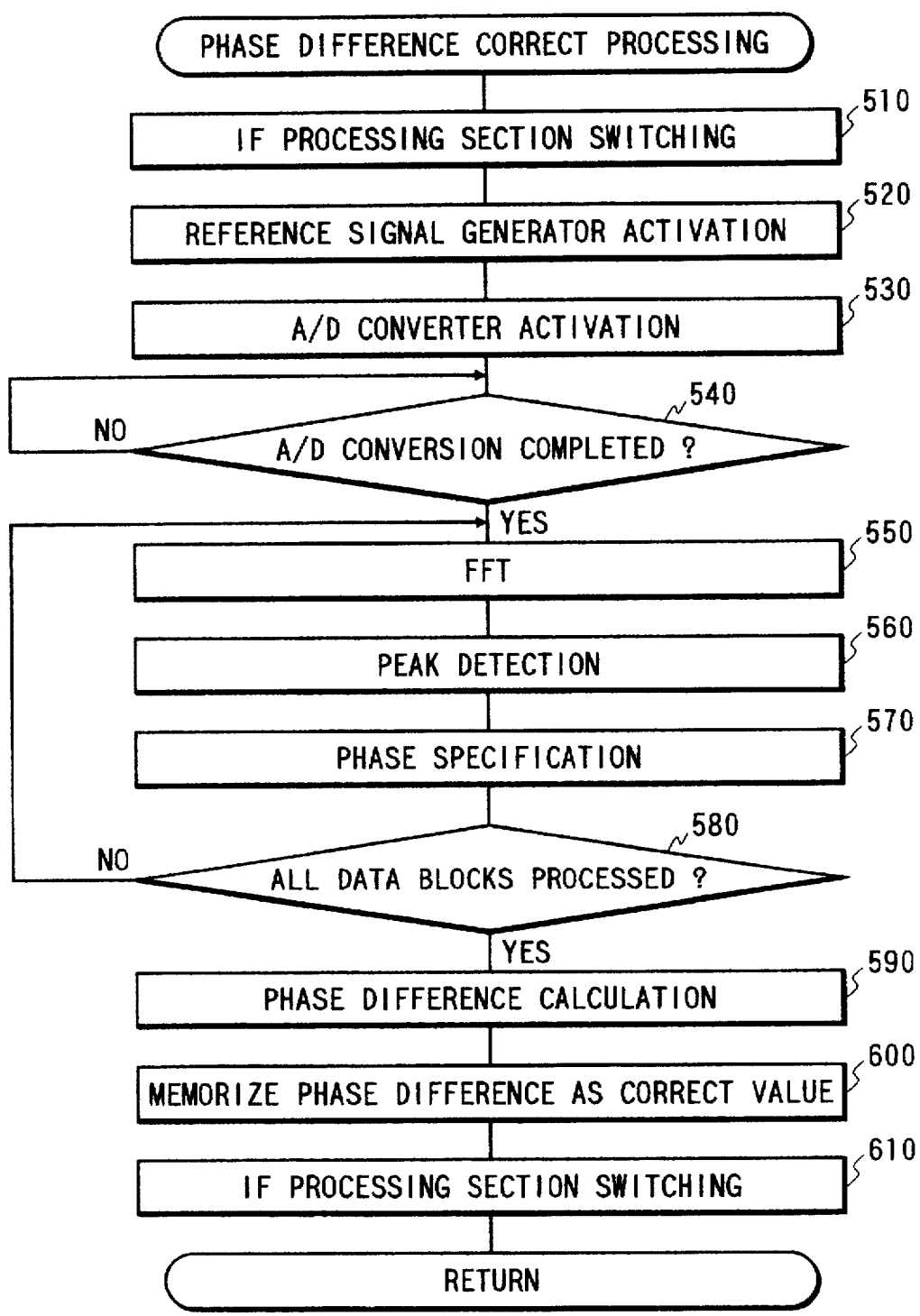
FIG. 14 is a flow chart showing a phase difference correct processing in accordance with the fourth embodiment of the present invention.

As shown in FIG. 14, after this routine is started, in step 510, changeover signal C3 is generated and the setting condition of switches W21 and W22 is changed to the second condition. In the next step 520, activation signal C4 is generated to cause reference signal generator 29 to produce reference signal Sf.

Succeeding steps 530 through 590 of this routine are identical with steps 120 through 180 of the obstacle detecting processing of the first embodiment. Namely, the beat signals B1 and B2 generated from receivers 14 and 16 are A/D converted, and are then subjected to the FFT calculation. Based on this FFT calculation result, the peak frequencies of beat signals B1 and B2 are detected. And, the phase of each frequency component is specified. The phase difference between beat signals B1 and B2 obtained from respective receiver channels CH1 and CH2 is calculated based on this specified phase.

In the next step 600, the phase difference calculated in the step 590 is memorized in a predetermined area of RAM 26c as a correction value. Then, in step 610, changeover signal C3 is generated to return the setting condition of switches W21 and W22 to the first condition. Then, the processing of this routine is completed.

The same reference signal Sf is entered into the IF processing circuits of receiver channels CH1 and CH2 during the execution of this phase difference correct processing. Therefore, in the same manner as in the third embodiment, the phase difference (correction value) obtained through this processing reflects the dispersion of phase characteristics in respective IF processing circuits (chiefly, low-pass filters 14d and 16d) varying the phases of beat signals B1 and B2.

Furthermore, reference signal Sf comprises all of the frequency components representing the frequency divisions ranging the entire frequency range of the beat signal to be detected. Accordingly, only one measurement can obtain the correction value for the phase difference applicable and effective to all of the frequency divisions.

Figure 15:
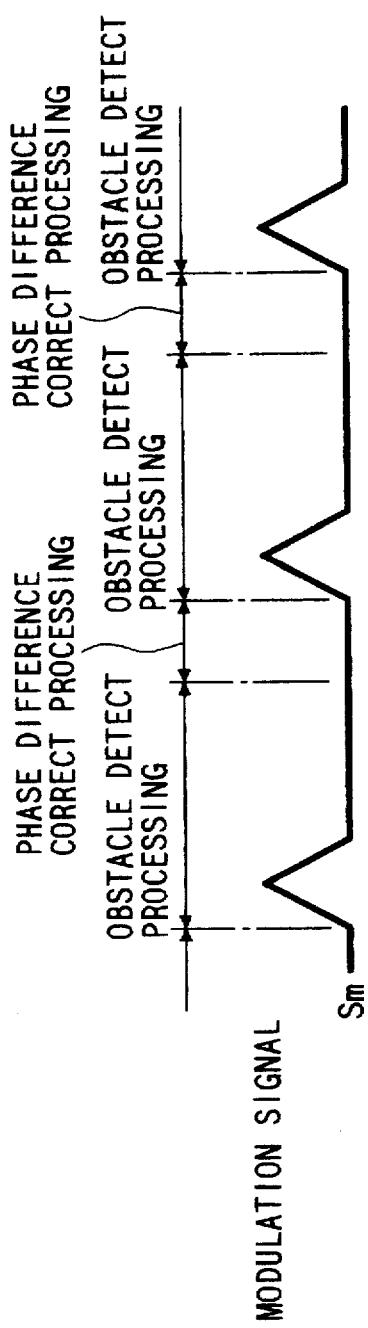
FIG. 15 is a view illustrating the execution timing of the phase difference correct processing in accordance with the fourth embodiment of the present invention.

Furthermore, according to the phase difference correct processing of this embodiment, reference signal generator 29 is provided separately from triangular wave generator 29 used in the obstacle detecting processing. Therefore, it becomes possible to generate reference signal Sf in the radar apparatus without emitting radar wave out of the apparatus. Hence, it becomes possible to perform the phase difference correct processing during an appropriate dormant period between two obstacle detecting processing without interrupting each obstacle detecting processing, as shown in FIG. 15.

As explained in the foregoing description, radar system 2b of this embodiment enters the same reference signal into respective IF processing circuits of receiver channels CH1 and CH2. Accordingly, the same effect as the third embodiment can be obtained.

Moreover, the reference signal Sf generated from radar system 2b of this embodiment comprises desirable frequency components. Hence, it becomes possible to surely and speedily store the correction value for each of frequency divisions covering the entire frequency range of the beat signal to be detected.

Although the reference signal generator 29 of this embodiment produces reference signal Sf comprising all of the frequency components representing respective frequency divisions ranging the entire frequency range of the beat signal, it is also acceptable that reference signal generator 29 successively generates reference signal Sf comprising a single frequency component corresponding to each frequency division. In such a case, in the same manner as in the third embodiment, it is desirable that the phase difference correct processing is repetitively performed until the correction values of all the frequency divisions are stored.

Although this embodiment provides switches SW21 and SW22 between preamplifiers 14c, 16c and low-pass filters 14d and 16d, it is also possible to provide these switches SW21 and SW22 between mixers 14b, 16b and preamplifiers 14c, 16c in the same manner as in the third embodiment. On the contrary, it will be possible to arrange the switches SW11 and SW12 of the third embodiment in the same manner as switches SW21 and SW22 of the fourth embodiment. Such a modification is basically allowed from the fact that low-pass filters 14d and 16d are the factor giving the largest influence to the phases of the beat signals and therefore a large influence is not caused when preamplifiers 14c and 16c are excluded from the phase difference correct processing.

Next, a fifth embodiment of the present invention will be explained.

The fifth embodiment is different from the radar system 2 of the first embodiment in the arrangement of the receiver. Hence, the arrangement of the receiver will be chiefly explained hereinafter. Similarly, sixth through eighth embodiments later explained are different from the radar system 2 of the first embodiment in the arrangement of the receiver.

As shown in FIG. 16, the receiver of the fifth embodiment comprises three receiver antennas 54a, 56a and 58a aligned in line, a switch Wa selecting one of reception signals of receiver antennas 54a and 58a. The reception signal supplied from switch Wa is successively processed in a mixer 55b, a preamplifier 55c, a low-pass filter 55d and a postamplifier 55e and is then finally generated as beat signal B1. On the other hand, a reception signal supplied from antenna 56a is successively processed in a mixer 56b, a preamplifier 56c, a low-pass filter 56d and a postamplifier 56e and is then finally generated as beat signal B2.

Figure 17:
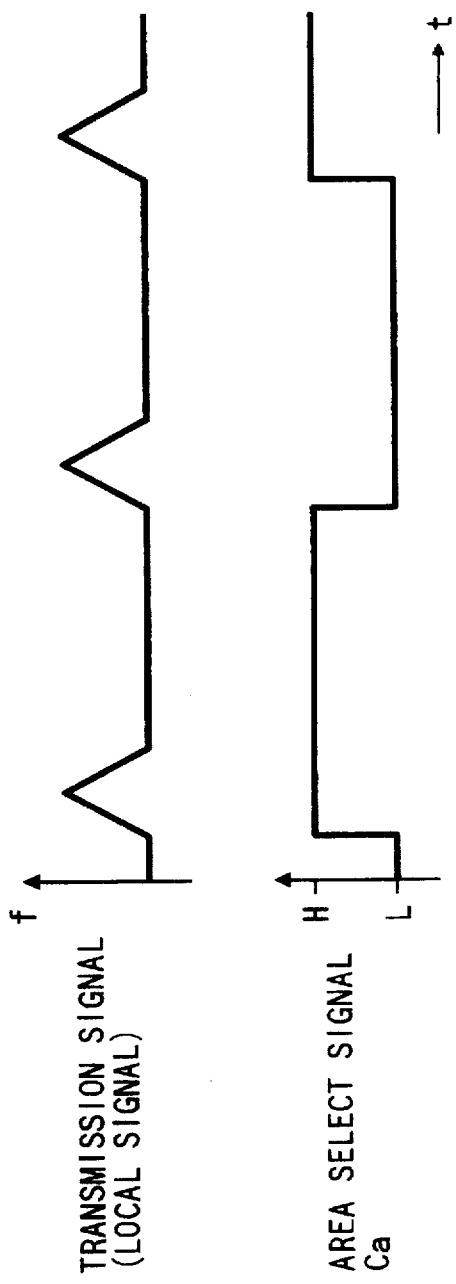
FIG. 17 is a view illustrating the switching timing of an area select signal in accordance with the fifth embodiment of the present invention.

Switch Wa is controlled by an area select signal Ca generated from micro computer 26 of signal processing section 20. As shown in FIG. 17, area select signal Ca is switched between High and Low levels every time the obstacle detecting processing is executed. Therefore, the reception signals from receiver antennas 54a and 58a are alternately supplied to mixer 55b.

In disposing receiver antennas 54a, 56a and 58a, the regions where the reception beams of neighboring two receiver antennas are overlapped, i.e. the regions capable of detecting the azimuth based on the beat signals B1 and B2 (hereinafter, referred to as "azimuth detecting region"), contacts with each other.

With this arrangement, it becomes possible to detect the azimuth of the target in both of the azimuth detecting region of receiver antennas 54a, 56a and the azimuth detecting region of receiver antennas 56a, 58a. In other words, the azimuth detecting region can be doubled compared with the two-antenna arrangement.

As explained in the foregoing description, according to the fifth embodiment, the receiver comprises a total of three antennas 54a through 58a, so that the obstacle detecting processing can be performed between two neighboring receiver antennas of three in-line receiver antennas. Accordingly, the obstacle detecting area can be enlarged. Especially, the azimuth detecting area capable of detecting the azimuth of the obstacle can be doubled.

Furthermore, generating only two beat signals from the reception signals of neighboring two receiver antennas 54a, 56a or 56a, 58a is effective to prevent the arrangement of the signal processing section from being complicated.

Although the above-described fifth embodiment comprises three receiver antennas, it is needless to say that four or more antennas can be provided.

Figure 18:
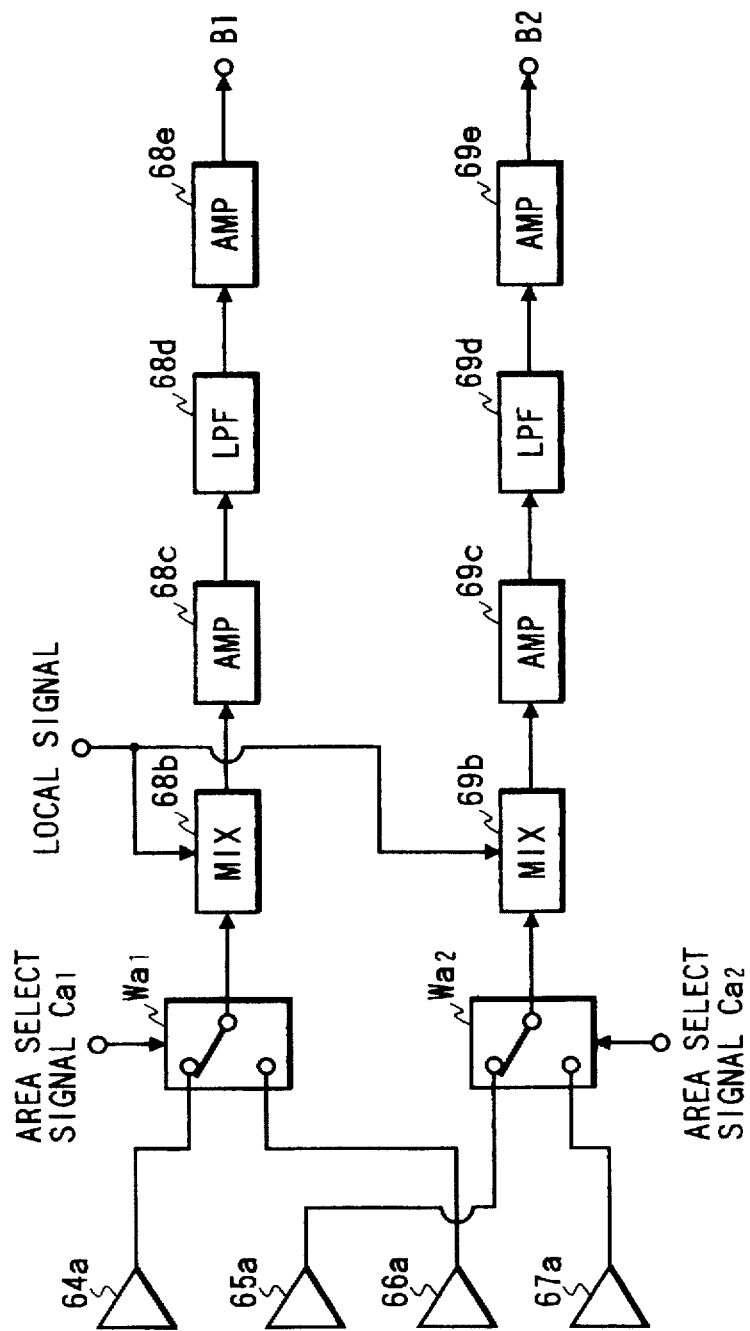
FIG. 18 is a schematic block diagram showing an arrangement of the fifth embodiment of the present invention when a total of four antenna are provided.

For example, as shown in FIG. 18, first to fourth receiver antennas 64a through 67a can be provided in an in-line arrangement. There is provided a switch Wa1 to select the reception signal between first and third receiver antennas 64a and 66a. Another switch Wa2 selects the reception signal between second and fourth receiver antennas 65a and 67a. The reception signal supplied from switch Wa1 is successively processed in a mixer 68b, a preamplifier 68c, a low-pass filter 68d, and a postamplifier 68e, and is then finally generated as beat signal B1. On the other hand, the reception signal supplied from switch Wa2 is successively processed in a mixer 69b, a preamplifier 69c, a low-pass filter 69d, and a postamplifier 69e, and is then finally generated as beat signal B2.

More specifically, in response to area select signals Ca1 and Ca2, switches Wa1 and Wa2 are opened or closed so as to select one combination from the group consisting of receiver antennas 64a, 65a, receiver antennas 65a, 66a, and receiver antennas 66a, 67a.

Figure 19:
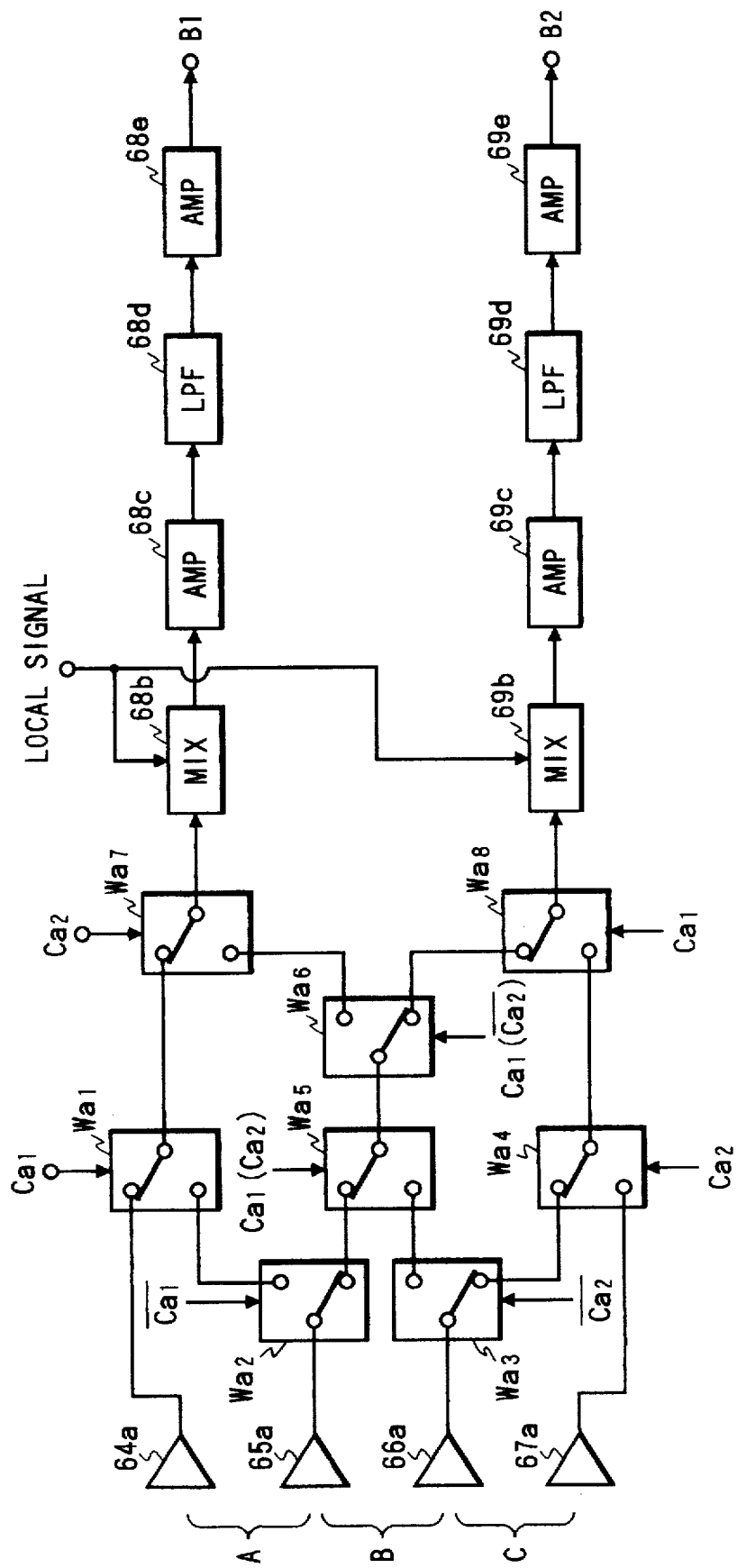
FIG. 19 is a schematic block diagram showing another arrangement of the fifth embodiment of the present invention when a total of four antenna are provided.

Alternatively, the switch arrangement for selecting the reception signals of any two neighboring receiver antennas of four receiver antennas can be modified as shown in FIG. 19 characterized by a total of fine alternative switches Wa1, Wa4, Wa5, Wa7 and Wa8 and a total of three distribution switches Wa2, Wa3 and Wa6.

According to this arrangement, the high-frequency signal wiring can be realized without causing any intersection. Two area select signals Ca1 and Ca2 (and their inverse signals) cooperatively control respective switches Wa1 through Wa8 in the following manner.

TABLE 1

| SWITCH | SELECTED RECEIVER ANTENNAS | | | CONTROL SIGNAL |
|---|---|---|---|---|
| | A | B | C | |
| Wa1 | H | L | x | Ca1 |
| Wa2 | L | H | x | $\overline{Ca1}$ |
| Wa3 | x | L | H | Ca2 |
| Wa4 | x | H | L | Ca2 |
| Wa5 | H | x | L | Ca1(Ca2) |
| Wa6 | L | x | H | $\overline{Ca1(Ca2)}$ |
| Wa7 | H | H | L | Ca2 |
| Wa8 | H | L | L | Ca1 |

As shown in table 1, area select signal Ca1 is supplied to switches Wa1, Wa5, and Wa8; the inverse signal of area select signal Ca1 is supplied to switches Wa2 and Wa6; area select signal Ca2 is supplied to switches Wa4 and Wa7; and the inverse signal of area select signal Ca2 is supplied to switch Wa3. Switches Wa5 and Wa6 can receive area select signal Ca2 and its inverse signal, instead of receiving area select signal Ca1 and its inverse signal.

When the set (A) of receiver antennas 64a and 65a is selected, both of area select signals Ca1 and Ca2 are set to High level. When the set (B) of receiver antennas 65a and 66a is selected, area select signal Ca1 is set to Low level and the other area select signal Ca2 is set to High level. When the set (C) of receiver antennas 66a and 67a is selected, both of area select signals Ca1 and Ca2 are set to Low level. In each switch Wa1 through Wa8, its moving terminal is shifted in accordance with the signal level of each of area select signals Ca1 and Ca2. When the signal level is High, the upper terminal shown in the drawing is selected. When the signal level is Low, the lower terminal is selected.

Next, a sixth embodiment of the present invention will be explained.

The receiver of the sixth embodiment provides a switch between the preamplifier and the low-pass filter instead of providing the switch between the receiving antenna and the mixer as shown in the receiver of the fifth embodiment of FIG. 16.

Figure 20:
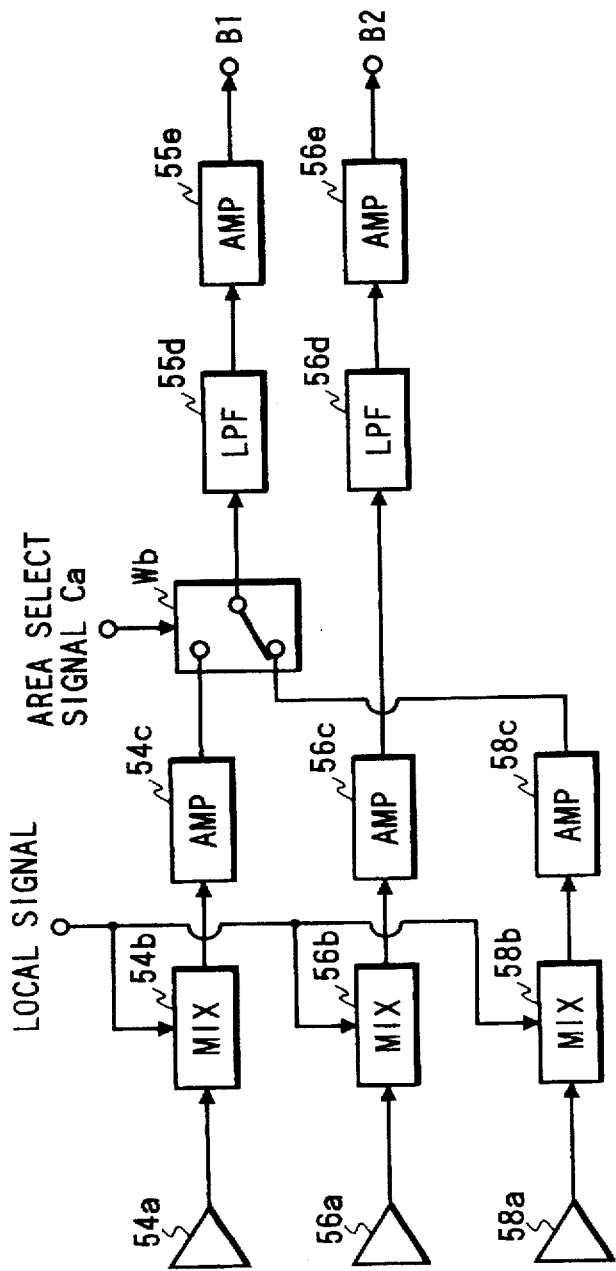
FIG. 20 is a schematic block diagram showing an arrangement of a sixth embodiment of the present invention.

More specifically, as shown in FIG. 20, the receiver of the sixth embodiment comprises mixers 54b, 56b, 58b and preamplifiers 54c, 56c, 58c processing the reception signals of three receiver antennas 54a, 56a and 58a aligned in line. Furthermore, there is a switch Wb selecting one of beat signals generated from preamplifiers 54c and 58c which process the signals of receiver antennas 54a and 58a. The output of switch Wb is processed by low-pass filter 55d and postamplifier 55e successively to generate beat signal B1. The output of preamplifier 56c processing the signal of receiver antenna 56a centrally disposed is processed by low-pass filter 56d and postamplifier 56e successively to generate beat signal B2.

Switch Wb is controlled by area select signal Ca used in the fifth embodiment to control switch Wa.

In this manner, according to the receiver of the sixth embodiment, switch Wb is disposed in the circuit receiving the mixed signal of the reception signal and the local signal. Hence, leakage of signal at the switch Wb is small compared with the switch Wa used for the high-frequency circuit. Thus, it becomes possible to reduce the size of the radar apparatus without deteriorating the detecting sensitivity.

In this sixth embodiment, it is of course possible to provide four or more antennas in the same manner as in the fifth embodiment.

Figure 21:
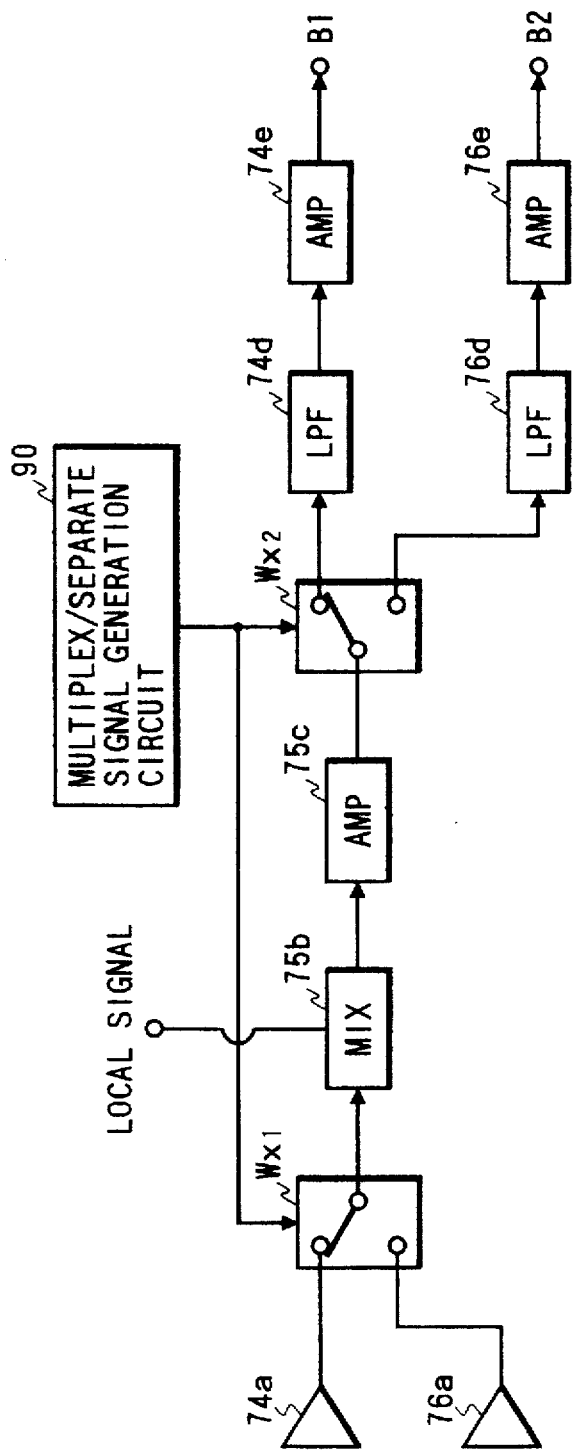
FIG. 21 is a schematic block diagram showing an arrangement of a receiving section of a radar system in accordance with a seventh embodiment of the present invention.
Figure 22:
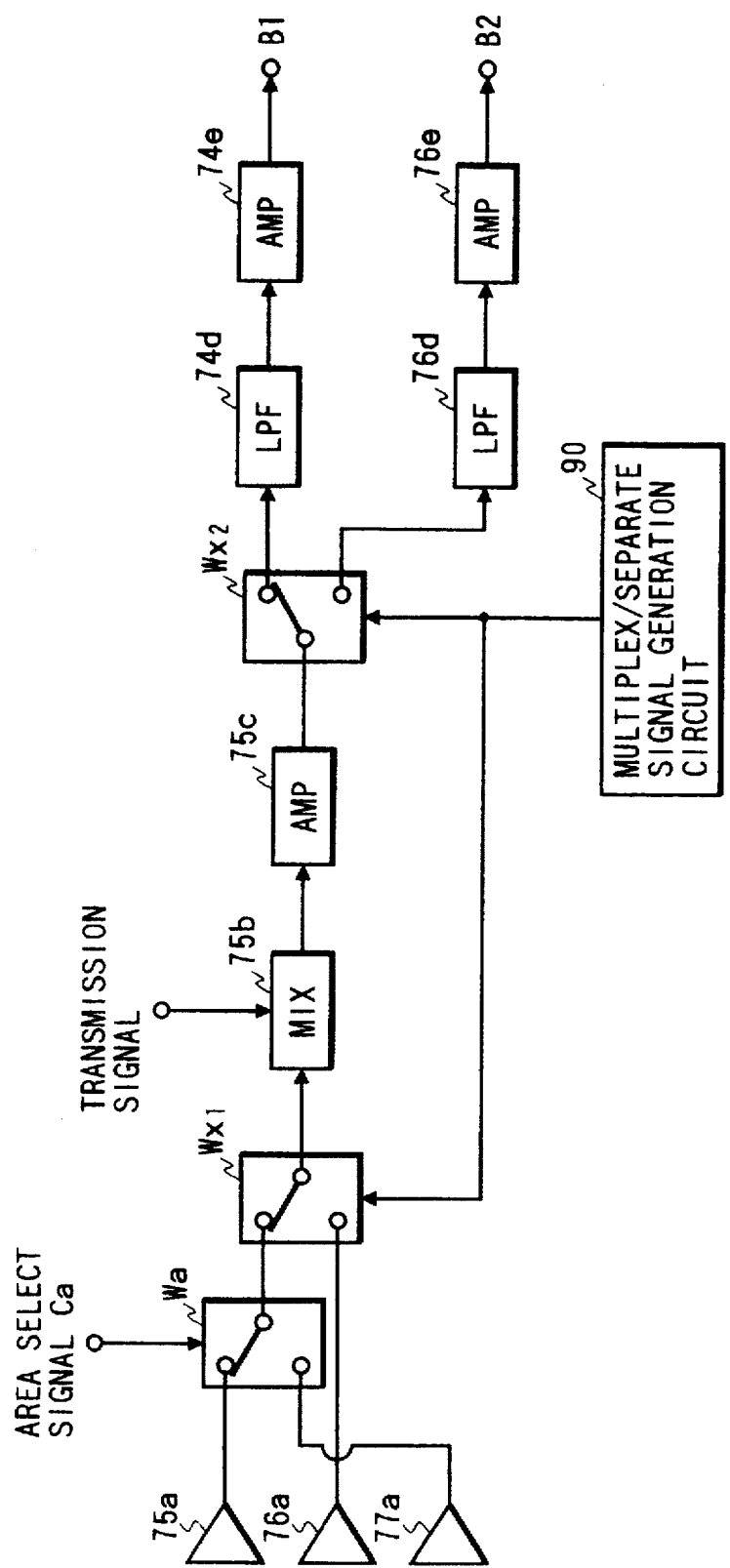
FIG. 22 is a schematic block diagram showing an arrangement of a receiving section of a radar system in accordance with an eighth embodiment of the present invention.
Figure 23:
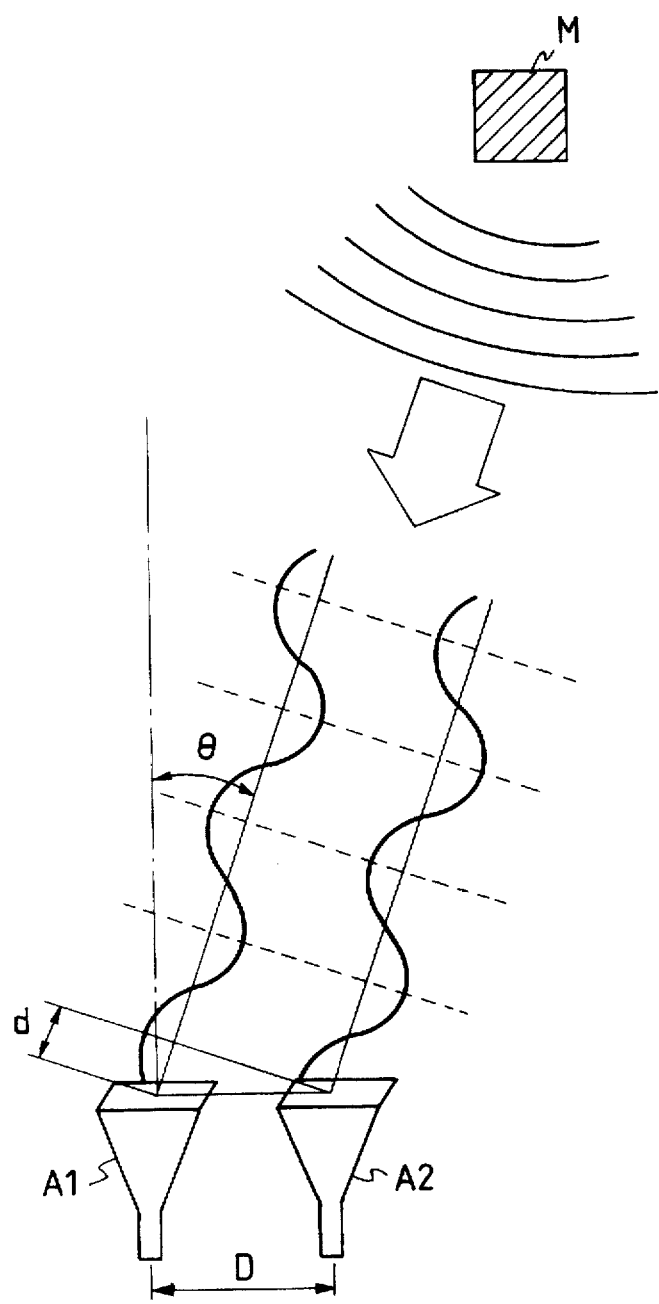
FIG. 23 is a view illustrating the principle of an azimuth calculation for obtaining an azimuth angle based on a phase difference between two signals received from a pair of antennas.

Next, a seventh embodiment of the present invention will be explained with reference to FIG. 21.

The receiver of the seventh embodiment comprises two receiver antennas 74a and 76a, a switch Wx1 selecting one of two reception signals of receiver antennas 74a and 76a, a mixer 75b and a preamplifier 75c processing the signal supplied from switch Wx1, a switch Wx2 distributing the output of preamplifier 75c into two streams, a low-pass filter 74d and a postamplifier 74e processing the one signal stream distributed by switch Wx2 and generating beat signal B1, a low-pass filter 76d and a postamplifier 76e processing the other signal stream distributed by switch Wx2 and generating beat signal B2, and a multiplex/separate signal generation circuit 90 generating a multiplex/separate signal for controlling the switching operation of switches Wx1 and Wx2 in a synchronized manner.

The multiplex/separate signal generation signal is operative at the frequency range twice as large as the frequency of the beat signal to be detected, e.g. in the range of not smaller than 200 kHz when the beat signal of 0 to 100 kHz is handled, to perform the switching operation of switches Wx1 and Wx2. The multiplex/separate signal generation signal synchronizes switches Wx1 and Wx2, and supplies the signal derived from the reception signal of receiver antenna 76a to low-pass filter 76d.

That is, the reception signal is time division multiplexed and supplied to mixer 75b and then mixed with the local signal, and then separated again. Low-pass filters 74d and 76d processing the separated signals are used as an anti-aliasing filter for limiting the bald to prevent the high-frequency components from causing aliasing as well as used for reproducing the comb-like discontinuous waveform of the signal generated from switch Wx2 to the original continuous waveform.

As explained in the foregoing description, according to the receiver of the seventh embodiment, only one mixer is commonly used to process the reception signal of each receiver antenna according to the time division method. Hence, the number of mixers can be reduced compared with the number of the beat signals to be generated simultaneously from the receiver. Accordingly, the downsizing of the radar apparatus can be realized.

Although the seventh embodiment multiplexes two reception signals, it is needless to say that three or more reception signals can be multiplexed.

An eighth embodiment of the present invention will be explained hereinafter.

The eighth embodiment is different from the seventh embodiment in that the receiver antenna 74a is replaced by receiver antennas 75a and 77a aligned in line together with and at both sides of the receiver antenna 76a and a switch Wa selectively supplying one of reception signals of receiver antennas 75a and 77a to switch Wx1.

In other words, the eight embodiment 13 different from the fifth embodiment shown in FIG. 16 in that mixers 55b, 56b and preamplifiers 55c, 56c are replaced by the technique of multiplexing and mixing the reception signals of the seventh embodiment.

Accordingly, according to the eighth embodiment, it becomes possible to reduce the size of the receiver having a wide azimuth detecting range, and hence the downsizing of high-performance radar system can be realized.

Mixers 68b, 69b (and preamplifiers 68c, 69c) shown in FIGS. 18 and 19 are also replaceable by the technique of multiplexing and mixing the reception signals. Similarly, mixers 54b through 58b (and preamplifiers 54c through 58c) of the receiver shown in FIG. 20 can be replaced by this multiplexing and mixing technique.

As this invention may be embodied in several forms without departing from the spirit of essential characteristics thereof, the present embodiments described are therefore intended to be only illustrative and not restrictive. Since the scope of the invention is defined by the appended claims rather than by the description preceding them, all changes that fall within the metes and bounds of the claims, or equivalents of such metes and bounds, are therefore intended to be embraced by the claims.

What is claimed is:

1. A radar system comprising:

transmitting means for generating a transmission signal having a predetermined frequency and sending out a radar wave carrying said transmission signal toward a target;

receiving means having at least two antennas for receiving said radar wave when said radar wave is reflected from said target; and signal processing means for detecting the azimuth of said target based on signals simultaneously received by said at least two antennas of said receiving means, wherein said transmitting means transmits continuous wave, said receiving means comprises mixing means for mixing reception signals of said antennas with said transmission signal to produce beat signals, said signal processing means comprises analysis means for performing the Fourier transformation of each beat signal to obtain a frequency spectrum of each beat signal, peak detecting means for detecting a peak in the frequency spectrum and specifying a frequency corresponding to the detected peak, detection value specifying means for specifying at least one of the phase and the amplitude of the frequency component corresponding to said peak as a detection value resultant from the analysis of said analysis means, and azimuth calculating means for calculating the azimuth of said target based on the difference between detection values for respective beat signals specified by said analysis means, said peak detecting means and said detection value specifying means.

2. The radar system in accordance with claim 1, wherein the transmission signal generated from said transmitting means comprises a plurality of frequency components, said receiving means comprises a separating means for producing said beat signal for each of said plurality of frequency components of said transmission signal, said analysis means, said peak detecting means, and said detection value specifying means cooperatively specify the detection value for each beat signal and for each of said plurality of frequency components of said transmission signal, and said azimuth calculating means calculates the azimuth of the target based on the difference of detection values specified for respective beat signals with respect to the same frequency component of said transmission signal.

3. The radar system in accordance with claim 1 wherein, said transmitting means generates the transmission signal having an ascending part and a descending part through frequency modulation by a modulation signal with a triangular waveform, said receiving means comprises separating means for producing the beat signal for each of said ascending part and said descending part of the transmission signal, said analysis means, said peak detecting means, said detection value specifying means cooperatively specify said detection value for each beat signal and for each of said ascending part and descending part of said transmission signal, and said azimuth calculating means calculates the azimuth of the target based on the difference of detection values specified for respective beat signals with respect to one of said ascending part and descending part of said transmission signal.

4. The radar system in accordance with claim 1, wherein said receiving means comprises at least three antennas aligned in line, said mixing means produces said beat signal for each of the reception signal of each antenna, and said system further comprises beat signal selecting means for selecting a pair of beat signals based on the reception signals of any two neighboring antennas.

5. The radar system in accordance with claim 1, wherein said receiving means comprises at least three antennas aligned in line, said receiving means further comprises reception signal selecting means for selecting a pair of reception signals of any two neighboring antennas from the reception signals of said antennas, and said mixing means produces the best signal for each of the reception signals selected by said reception signal selecting means.

6. A radar system comprising:

transmitting means for generating a transmission signal having a predetermined frequency and sending out a radar wave carrying said transmission signal toward a target;

receiving means comprising:

at least two antennas for receiving said radar wave when said radar wave is reflected from said target;

signal multiplexing means for performing the time division multiplexing of a plurality of reception signals, mixing means mixing the reception signal multiplexed by said signal multiplexing means with said transmission signal, signal separating means operated in synchronism with said signal multiplexing means for separating the output of said mixing means, and signal reproducing means for restoring a discontinuous waveform of each signal separated by said signal separating means to a continuous waveform, thereby producing beat signals, whereby said mixing means is commonly used for said plurality of reception signals, and signal processing means for detecting the azimuth of said target based on an output signal of said receiving means, wherein said transmitting means transmits continuous wave, and said signal processing means comprises frequency analysis means for performing the Fourier transformation of each beat signal to obtain a frequency spectrum of each of the beat signals, peak detecting means for detecting a peak in the frequency spectrum and specifying a frequency corresponding to the detected peak, detection value specifying means for specifying at least one of the phase and the amplitude of the frequency component corresponding to said peak as a detection value resultant from the analysis of said analysis means, and azimuth calculating means for calculating the azimuth of said target based on the difference between detection values for respective beat signals specified by said analysis means, said peak detecting means and said detection value specifying means.

7. The radar system in accordance with claim 1, wherein said receiving means comprises:

band limiting means for limiting the frequency band of each beat signal supplied to said signal processing means;

signal switching means for selectively supplying said band limiting means a reference signal or the beat signal corresponding to said band limiting means, said signal processing means comprises correction value memorizing means for memorizing said detection value obtained by said signal processing means as a correction value when said signal switching means supplies said reference signal to said band limiting means; and said azimuth calculating means corrects the detection value specified for each beat signal using the correction value memorized in said correction value memorizing means and calculates the azimuth of the target using the corrected detection value.

8. The radar system in accordance with claim 7, wherein one of beat signals generated from said mixing means is used as said reference signal.

9. The radar system in accordance with claim 7, wherein signal generating means is provided for generating a signal having a frequency component substantially identical with said beat signal, and the signal generated from said signal generating means is used as said reference signal.

10. A radar system comprising:

a transmitter generating a transmission signal having a predetermined frequency and sending out a radar wave carrying said transmission signal toward a target;

a receiver having at least two antennas for receiving said radar wave when said radar wave is reflected from said target; and a signal processing section detecting the azimuth of said target based on signals simultaneously received by said at least two antennas of said receiver, wherein;

said transmitter transmits continuous wave;

said receiver comprises a mixer for mixing reception signals of said antennas with said transmission signal to produce beat signals;

said signal processing section means comprises a frequency analysis section for performing the Fourier transformation of each beat signal to obtain a frequency spectrum of each beat signal, a peak detecting section for detecting a peak in the frequency spectrum and specifying a frequency corresponding to the detected peak, detection value specifying means for specifying at least one of the phase and the amplitude of the frequency component corresponding to said peak as a detection value resultant from the analysis of said frequency analysis section, and an azimuth calculating section for calculating the azimuth of said target based on the difference between detection values for respective beat signals specified by said frequency analysis section, said peak detecting section and said detection value specifying means.

11. The radar system in accordance with claim 10, wherein the transmission signal generated from said transmitter comprises a plurality of frequency components;

said receiver comprises a separating means for producing said beat signal for each of said plurality of frequency components of said transmission signal;

said frequency analysis section, said peak detecting section, and said detection value specifying means cooperatively specify the detection value for each beat signal and for each of said plurality of frequency components of said transmission signal; and said azimuth calculating section calculates the azimuth of the target based on the difference of detection values specified for respective beat signals with respect to the same frequency component of said transmission signal.

12. The radar system in accordance with claim 10 wherein:

said transmitter generates the transmission signal having an ascending part and a descending part through frequency modulation by a modulation signal with a triangular waveform;

said receiver comprises separating means for producing the beat signal for each of said ascending part and said descending part of the transmission signal;

said analysis section, said peak detecting section, said detection value specifying means cooperatively specify said detection value for each beat signal and for each of said ascending part and descending part of said transmission signal; and said azimuth calculating section calculates the azimuth of the target based on the difference of detection values specified for respective beat signals with respect to one of said ascending part and descending part of said transmission signal.

13. The radar system in accordance with claim 10, wherein:

said receiver comprises at least three antennas aligned in line;

said mixer produces said beat signal for each of the reception signal of each antenna; and beat signal selecting means provided to select a pair of beat signals based on the reception signals of any two neighboring antennas.

14. The radar system in accordance with claim 10, wherein:

said receiver comprises at least three antennas aligned in line;

said receiver further comprises reception signal selecting means for selecting a pair of reception signals of any two neighboring antennas from the reception signals of said antennas; and said mixer produces the beat signal for each of the reception signals selected by said reception signal selecting means.

15. The radar system in accordance with claim 10, wherein said receiver comprises:

signal multiplexing means for performing the time division multiplexing of a plurality of reception signals;

signal separating means operated in synchronism with said signal multiplexing means for separating the output of said mixing means; and signal reproducing means for restoring a discontinuous waveform of each signal separated by said signal separating means to a continuous waveform, thereby producing the beat signal;

whereby said mixer is commonly used for said plurality of reception signals.

16. The radar system in accordance with claim 10, wherein said receiver comprises:

band limiting means for limiting the frequency band of each beat signal supplied to said signal processing section;

signal switching means for selectively supplying said band limiting means a reference signal or the beat signal corresponding to said band limiting means;

said signal processing section comprises correction value memorizing means for memorizing said detection value obtained by said signal processing section as a correction value when said signal switching means supplies said reference signal to said band limiting means; and said azimuth calculating means corrects the detection value specified for each beat signal using the correction value memorized in said correction value memorizing means and calculates the azimuth of the target using the corrected detection value.

17. The radar system in accordance with claim 16, wherein one of beat signals generated from said mixer is used as said reference signal.

18. The radar system in accordance with claim 16, wherein signal generating means is provided for generating a signal having a frequency component substantially identical with said beat signal, and the signal generated from said signal generating means is used as said reference signal.

* * * * *